US 10,100,604 B2

(12) United States Patent
Hopper et al.

(10) Patent No.: US 10,100,604 B2
(45) Date of Patent: Oct. 16, 2018

(54) VALVE ASSEMBLY WITH CAGE AND FLOW CONTROL ASSEMBLY

(71) Applicant: Cameron International Corporation, Houston, TX (US)

(72) Inventors: Hans Paul Hopper, Scotland (GB); Fergal Finn, Ardee (IE)

(73) Assignee: Cameron International Corporation, Houston, TX (US)

( * ) Notice: Subject to any disclaimer, the term of this patent is extended or adjusted under 35 U.S.C. 154(b) by 91 days.

(21) Appl. No.: 14/972,071

(22) Filed: Dec. 16, 2015

(65) Prior Publication Data

US 2016/0186892 A1    Jun. 30, 2016

(30) Foreign Application Priority Data

Dec. 24, 2014 (GB) .................................... 1423190.6

(51) Int. Cl.
*F16K 47/08* (2006.01)
*E21B 34/04* (2006.01)
(Continued)

(52) U.S. Cl.
CPC .............. *E21B 34/04* (2013.01); *E21B 34/02* (2013.01); *F16K 25/04* (2013.01); *F16K 47/08* (2013.01);
(Continued)

(58) Field of Classification Search
CPC .......... F16K 3/24; F16K 47/04; F16K 47/045; F16K 47/08; F16K 47/12; Y10T 137/86734; F15D 1/0015
(Continued)

(56) References Cited

U.S. PATENT DOCUMENTS 2,105,681 A    1/1938 Armstrong
2,233,077 A    2/1941 Gillespie et al.
(Continued)

FOREIGN PATENT DOCUMENTS

DE    3515925 A1    11/1986
DE    3615432 A1    11/1987
(Continued)

OTHER PUBLICATIONS

PCT Invitation to Pay Additional Fees; Application No. PCT/US2015/066493; Dated Apr. 22, 2016; 9 pages.
(Continued)

*Primary Examiner* — Matthew W Jellett
(74) *Attorney, Agent, or Firm* — Fletcher Yoder, P.C.

(57) ABSTRACT

A valve assembly is provided, the assembly comprising a valve housing; an inlet for fluid entering the valve housing; an outlet for fluid leaving the valve housing; a flow control assembly disposed within the valve housing between the inlet and the outlet, whereby fluid entering the valve housing is caused to flow through the flow control assembly, the flow control assembly comprising a cage having apertures therethrough to provide passage for fluid passing from the inlet to the outlet, the cage having an outlet end, in use fluid flowing within the cage in a downstream direction towards the outlet; a closure assembly moveable with respect to the cage to open or close each of the apertures through the cage, to thereby control the flow of fluid through the cage; wherein the apertures in the cage extend through the cage at a first angle to the radial direction of the cage and at a second angle to the radial direction of the cage, such that, in use, fluid entering the cage through each aperture is directed into the cage at the first angle to the radial direction so as to flow around the interior of the cage and at the second angle to the radial direction of the cage so as to flow in the downstream
(Continued)

direction towards the outlet end of the cage. A cage assembly is also provided. The valve assembly is of particular use in a wellhead assembly.

28 Claims, 13 Drawing Sheets

(51) Int. Cl.
| | |
|---|---|
| *F16K 25/04* | (2006.01) |
| *F16K 47/12* | (2006.01) |
| *E21B 34/02* | (2006.01) |
| *F16K 47/16* | (2006.01) |

(52) U.S. Cl.
CPC .............. *F16K 47/12* (2013.01); *F16K 47/16* (2013.01); *Y10T 137/86734* (2015.04)

(58) Field of Classification Search
USPC ................................ 137/625.3; 251/126, 127
See application file for complete search history.

(56) References Cited

U.S. PATENT DOCUMENTS

| | | | |
|---|---|---|---|
| 2,598,187 A | | 5/1952 | Meyer |
| 3,200,842 A | | 8/1965 | Wilson |
| 3,572,382 A | | 3/1971 | Luthe |
| 3,780,767 A | * | 12/1973 | Borg ................. F16K 47/08 137/625.3 |
| 3,813,079 A | * | 5/1974 | Baumann ............... F16K 47/08 137/270 |
| 3,821,968 A | * | 7/1974 | Barb ..................... F16K 47/04 137/625.3 |
| 3,971,415 A | * | 7/1976 | Foller ..................... F16K 47/08 137/630.19 |
| 4,041,982 A | * | 8/1977 | Lindner ................. F16K 47/08 137/625.3 |
| 4,384,592 A | | 5/1983 | Ng |
| 4,557,463 A | | 12/1985 | Tripp et al. |
| 4,569,370 A | | 2/1986 | Witt |
| 4,617,963 A | | 10/1986 | Stares |
| 4,671,321 A | | 6/1987 | Paetzel et al. |
| 4,848,472 A | | 7/1989 | Hopper |
| 5,005,605 A | | 4/1991 | Kueffer et al. |
| 5,018,703 A | * | 5/1991 | Goode ................. F16K 47/08 137/625.3 |
| 5,086,808 A | | 2/1992 | Pettus |
| 5,236,014 A | * | 8/1993 | Buls ..................... F16K 39/04 137/625.3 |
| 5,431,188 A | | 7/1995 | Cove |
| 5,964,248 A | | 10/1999 | Enarson et al. |
| 6,505,646 B1 | | 1/2003 | Singleton |
| 6,637,452 B1 | | 10/2003 | Alman |
| 6,782,920 B2 | | 8/2004 | Steinke |
| 6,851,658 B2 | | 2/2005 | Fitzgerald et al. |
| 6,997,211 B2 | | 2/2006 | Alman et al. |
| 7,789,105 B2 | | 9/2010 | Zecchi et al. |
| 8,371,333 B2 | | 2/2013 | Bohaychuk |
| 8,490,652 B2 | | 7/2013 | Bohaychuk et al. |
| 8,522,887 B1 | | 9/2013 | Madison |
| 9,458,941 B2 | | 10/2016 | Bohaychuk |
| 2002/0017327 A1 | | 2/2002 | Kawaai et al. |
| 2003/0024580 A1 | * | 2/2003 | Bohaychuk ............. E21B 34/02 137/625.37 |
| 2003/0226600 A1 | * | 12/2003 | Stares ..................... F16K 47/08 137/625.3 |
| 2005/0006150 A1 | | 1/2005 | Sims et al. |
| 2007/0240774 A1 | * | 10/2007 | McCarty ................. F16K 47/08 137/625.37 |
| 2009/0026395 A1 | * | 1/2009 | Perrault .................. F16K 47/08 251/127 |
| 2010/0288389 A1 | | 11/2010 | Hopper et al. |
| 2012/0227813 A1 | | 9/2012 | Meek et al. |
| 2012/0285546 A1 | | 11/2012 | Ter Haar et al. |
| 2016/0186891 A1 | * | 6/2016 | Hopper ................... E21B 34/02 251/121 |
| 2016/0186892 A1 | | 6/2016 | Hopper et al. |

FOREIGN PATENT DOCUMENTS

| | | | | |
|---|---|---|---|---|
| DE | 3717128 A1 | * | 12/1988 | .......... F15D 1/0015 |
| EP | 1278979 A1 | | 1/2003 | |
| EP | 1278979 B1 | | 9/2003 | |
| EP | 2042684 A1 | | 4/2009 | |
| EP | 2042685 A1 | | 4/2009 | |
| GB | 2462879 A | | 3/2010 | |
| JP | S59140972 A | | 8/1984 | |

OTHER PUBLICATIONS

PCT International Search Report and Written Opinion; Application No. PCT/US2015/066493; dated Jul. 25, 2016; 20 pages.
PCT International Search Report and Written Opinion; Application No. PCT/US2015/066500; dated May 9, 2016; 14 pages.
PCT Invitation to Pay Additional Fees and International Search Report; Application No. PCT/US2015/066509; dated May 9, 2016; 7 pages.
PCT International Search Report and Written Opinion; Application No. PCT/US2015/066509; dated Aug. 1, 2016; 17 pages.
PCT International Search Report and Written Opinion; Application No. PCT/US2015/066507; dated Jun. 1, 2016; 15 pages.
GB Examination Report; Application No. GB1423203.7; dated Mar. 24, 2017; 2 pages.

* cited by examiner

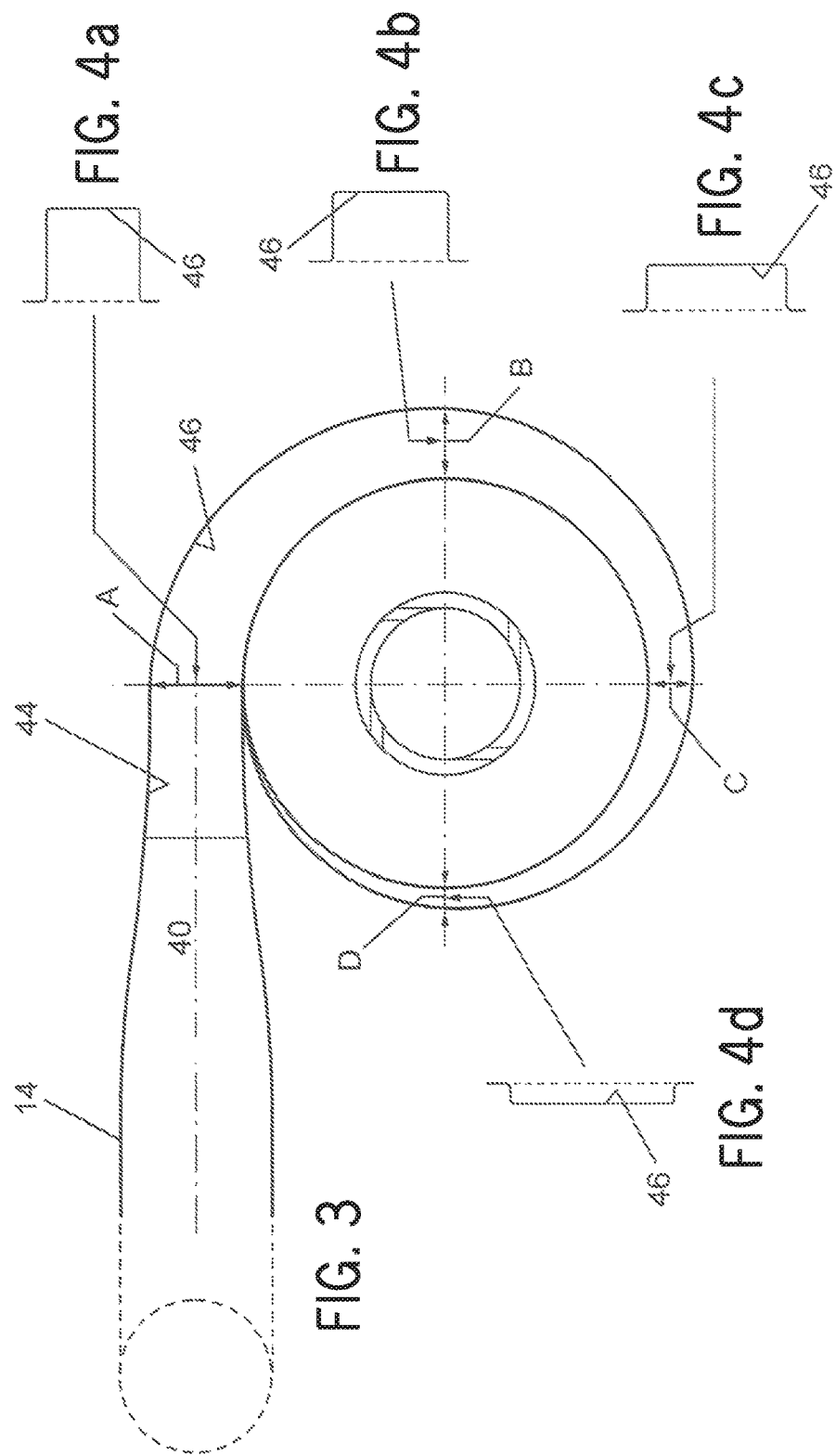

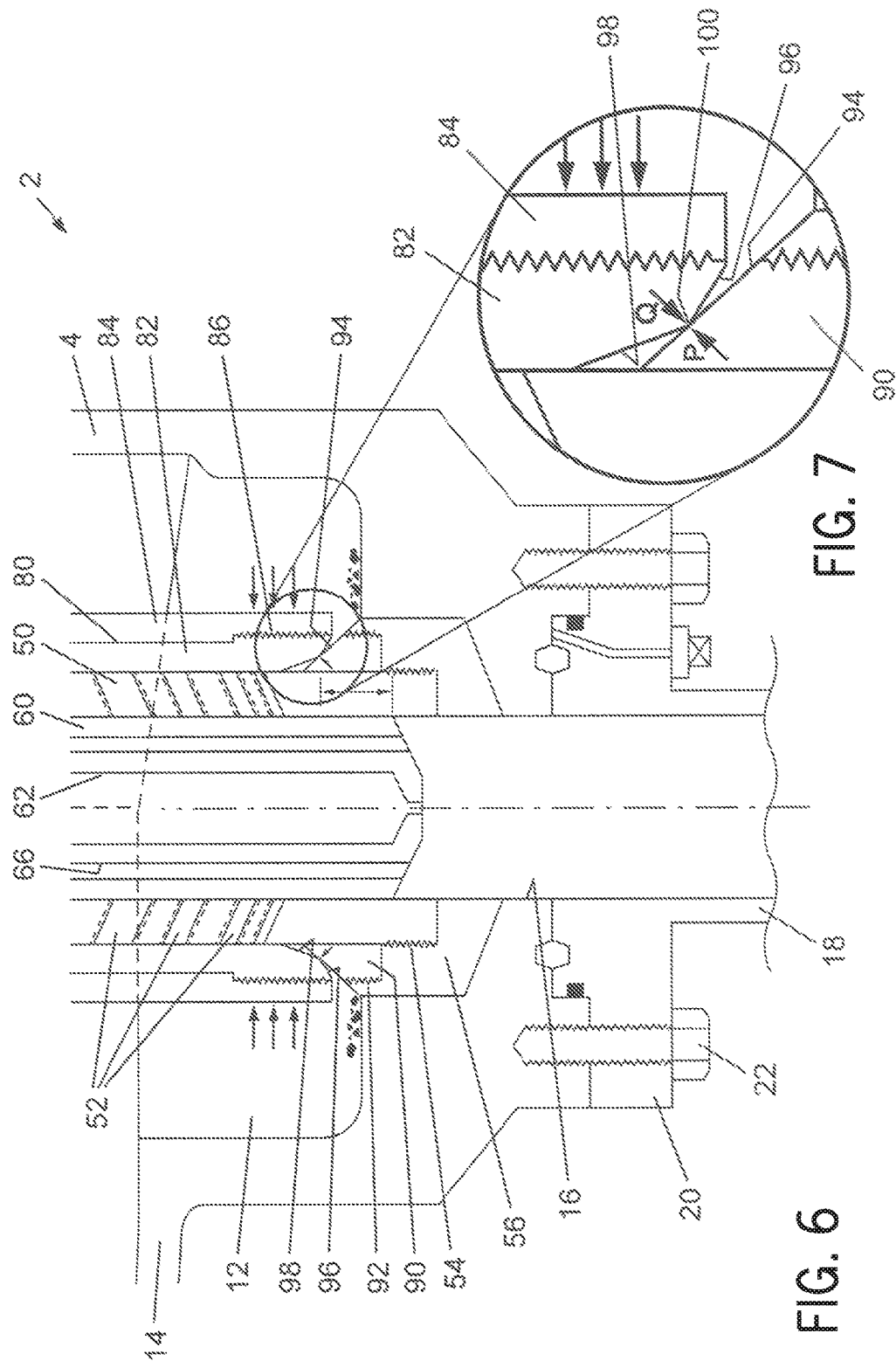

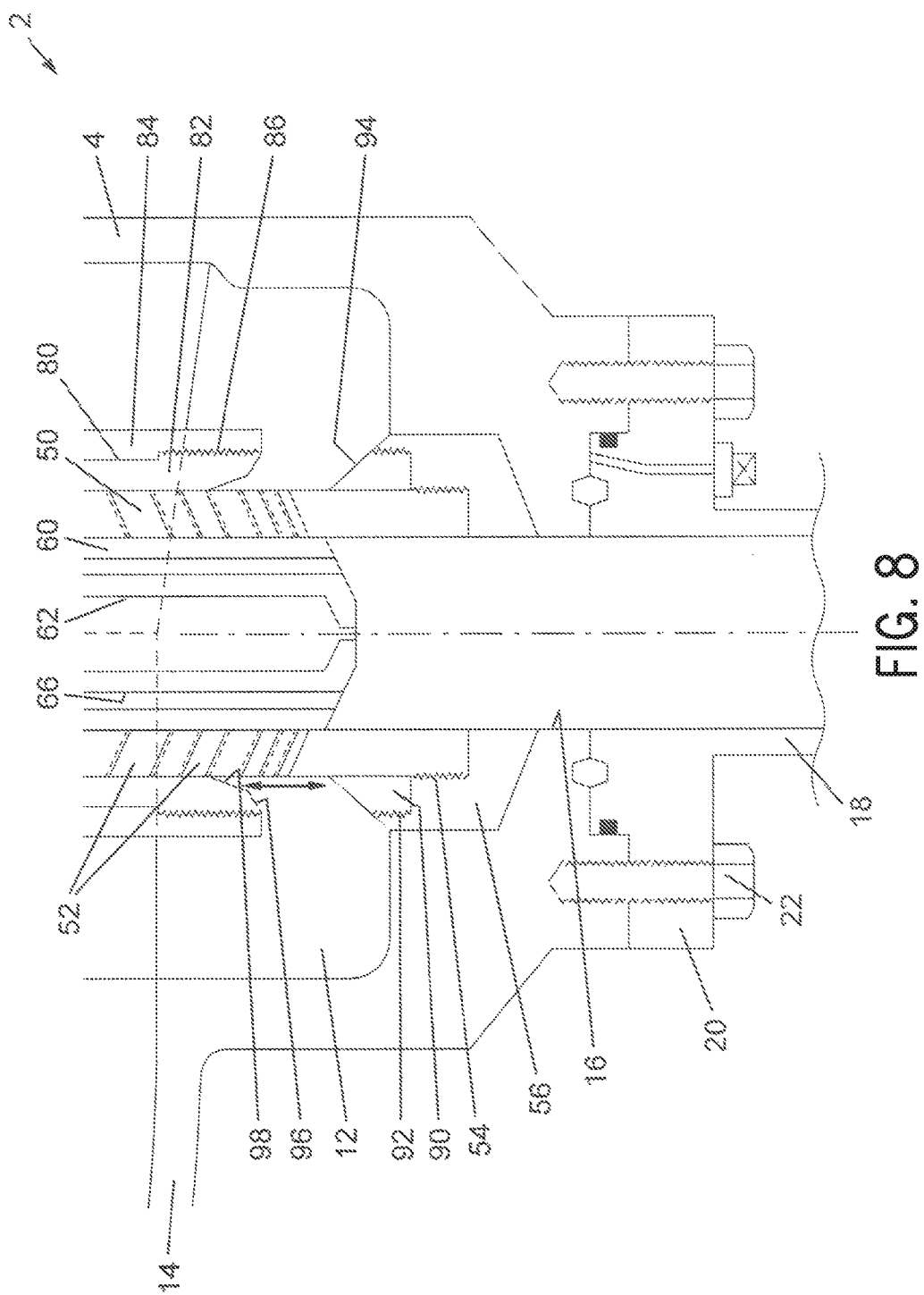

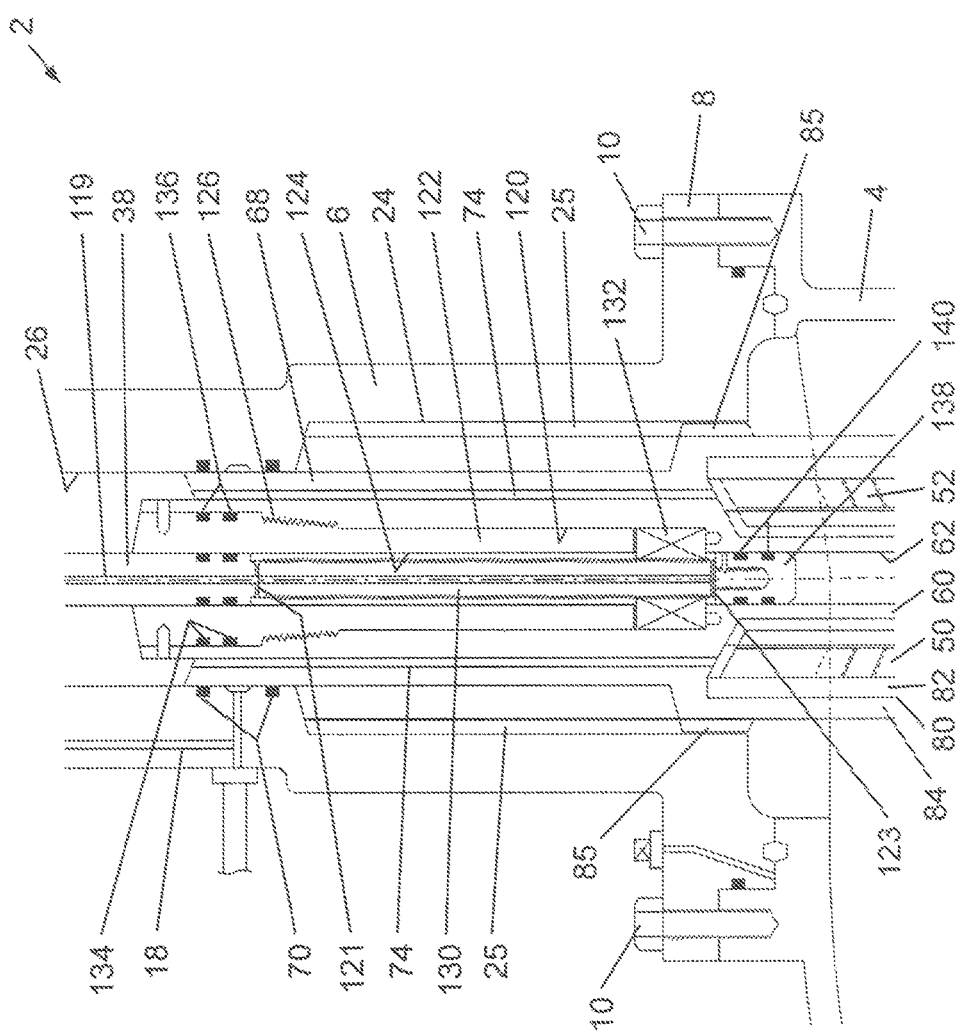

VALVE ASSEMBLY WITH CAGE AND FLOW CONTROL ASSEMBLY

CROSS REFERENCE TO RELATED APPLICATION

This application claims priority to and benefit of Great Britain Application No. GB1423190.6, entitled "VALVE ASSEMBLY", filed Dec. 24, 2014, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The present invention relates to a valve assembly, in particular to a valve assembly having a flow control element of the plug and cage type arrangement, and to the use of the valve assembly in the processing of fluid streams. The present invention further relates to a wellhead assembly comprising the valve assembly, in particular a subsea wellhead assembly.

Valve assemblies are well known and widely used in an extensive range of fluid processing applications. Valves are used to control the flow of a fluid stream, for example to control the flow rate and/or pressure of the fluid stream.

One common valve assembly comprises a flow control element having a so-called 'plug and cage' arrangement. This assembly has a cage, typically cylindrical in form, comprising a plurality of holes or apertures therethrough for the passage of fluid. A plug, again generally cylindrical in form, is provided so as to be moveable with respect to the cage, the plug being disposed to be moveable to cover or close the apertures in the cage. The plug may be moved with respect to the cage between a closed position, in which all the apertures in the cage are covered, thus preventing fluid from flowing through the choke assembly, and a fully open position, in which all the apertures in the cage are open and available for fluid flow. Moving the plug with respect to the cage from the closed to the fully open position progressively uncovers the apertures in the cage, thus increasing the cross-sectional area available for fluid flow. In this way, the flow rate and pressure of the fluid may be varied and controlled. In the closed position, the end sealing portion of the plug contacts a seat formed in the choke assembly, so as to provide a fluid-tight seal, preventing the passage of fluid past the plug and cage. The plug may be arranged coaxially within the cage or coaxially exterior of the cage, known in the art as an external sleeve.

FR 2 436 922 discloses a valve for controlling the flow of a fluid, the valve comprising a housing having an inlet for fluid. The inlet is disposed in the wall of the housing and fluid flow through the inlet is controlled by a vane pivotably mounted at one side of the opening. Fluid leaves the housing through a centrally disposed outlet.

A fluid flow choke is disclosed in GB 2 124 341 and has a stationary tubular flow nozzle with throttling ports formed in a side wall thereof. A moveable throttling ring is moved over the nozzle to restrict or close the ports.

DE 36 15 432 concerns a flow valve having a slide gate moveable to align with a flow opening. The slide gate has an opening therein that has a cross-sectional area matched to that of the flow opening, such that a substantially constant response sensitivity is obtained across the range of settings of the valve.

A balanced sleeve control choke is described and shown in U.S. Pat. No. 5,086,808. The choke has a cage provided with openings therein and an exterior sleeve moveable over the cage to open and close the openings, thereby controlling the flow of fluid through the cage.

A valve having a closure member for creating turbulence in the flow of liquid through the valve is disclosed in U.S. Pat. No. 5,617,896.

U.S. Pat. No. 5,979,558 discloses a variable choke for use in subterranean well. The choke comprises an inner sleeve with openings therein, moveable with respect to an outer sleeve.

An apparatus and method for controlling the flow of a fluid is disclosed in WO 01/02697. The apparatus comprises a valve assembly having an orifice therein through which fluid flows. The orifice is shaped to provide a substantially consistent or otherwise predetermined change in pressure drop and flow rate between different positions of the valve. This is achieved by the orifice being shaped to provide a non-linear variation in the flow area throughout several positions of the valve.

US 2002/0020534 discloses a flow control device having inner and outer sleeves moveable with respect to each other and both provided with openings therein for the flow of fluid. The fluid flow is controlled by appropriate positioning of the inner and outer sleeves relative to each other.

A well choke is disclosed in US 2007/0095411. The choke is of a plug and cage design and has a quick closure device mounted between an actuator and the choke.

A flow control valve for gaseous or liquid media is disclosed in DE 37 17 128. The flow control valve comprises a plug and cage assembly arranged within a fluid inlet chamber. The plug and cage assembly is offset from the central longitudinal axis of the inlet chamber. The cage comprises a plurality of openings arranged in the wall of the cage. One portion of the cage comprises six openings extending horizontally through the cage, that is perpendicular to the longitudinal axis of the cage, at a tangent to the inner surface of the cage. Fluid flow through the openings in the cage is controlled by the position of the plug within the cage. A delivery chamber is disposed immediately downstream of the cage and is provided with a retarder to stop rotational flow of the fluid and produce a linear fluid flow pattern leaving the device.

More recently, EP 2 386 717 discloses a valve assembly of the plug and cage arrangement. The cage of the valve assembly is provided with a plurality of apertures therein, with the flow of fluid through the cage being controlled by the position of the plug within the cage. The apertures in the cage are arranged into rows, each row having one or more apertures. The rows of apertures are separated by lands, in which no apertures are present. In this way, the plug may be positioned within the cage such that its end face aligns with a land and does not extend across an aperture. In this position, each aperture is either fully open or fully closed. An advantage of this arrangement is that the erosion of the end face of the plug is significantly reduced. The apertures may extend tangentially to the inner wall of the cage.

EP 2 386 717 also discloses for the first time the formation of fluid bands within the cage of the valve assembly by fluid entering through the apertures. Each row of apertures can form a band of rotating fluid within the cage. The fluid bands act as hydraulic chokes, throttling the flow of fluid in the downstream direction within the cage.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 3 is a diagrammatical cross-sectional view of the lower housing of the valve assembly along the line III-III of FIG. 2;

FIGS. 4a, 4b, 4c and 4d are diagrammatical cross-sectional views of the channel in the inner wall of the lower housing of the valve assembly of FIG. 2, at the positions A, B, C and D respectively of FIG. 3;

FIG. 6 is a cross-sectional view of a portion of the flow control assembly of FIG. 1 in the fully closed position;

FIG. 7 is an enlarged cross-sectional view of the seating arrangement of the flow control assembly shown in FIG. 6;

FIG. 8 is a cross-sectional view as in FIG. 6, but with the flow control assembly in a position intermediate between the fully closed position and the fully open position;

FIG. 10 is a detailed cross-sectional view of the assembly of FIG. 1, showing a second portion of the actuator mechanism;

DETAILED DESCRIPTION OF SPECIFIC EMBODIMENTS

Figure 1:
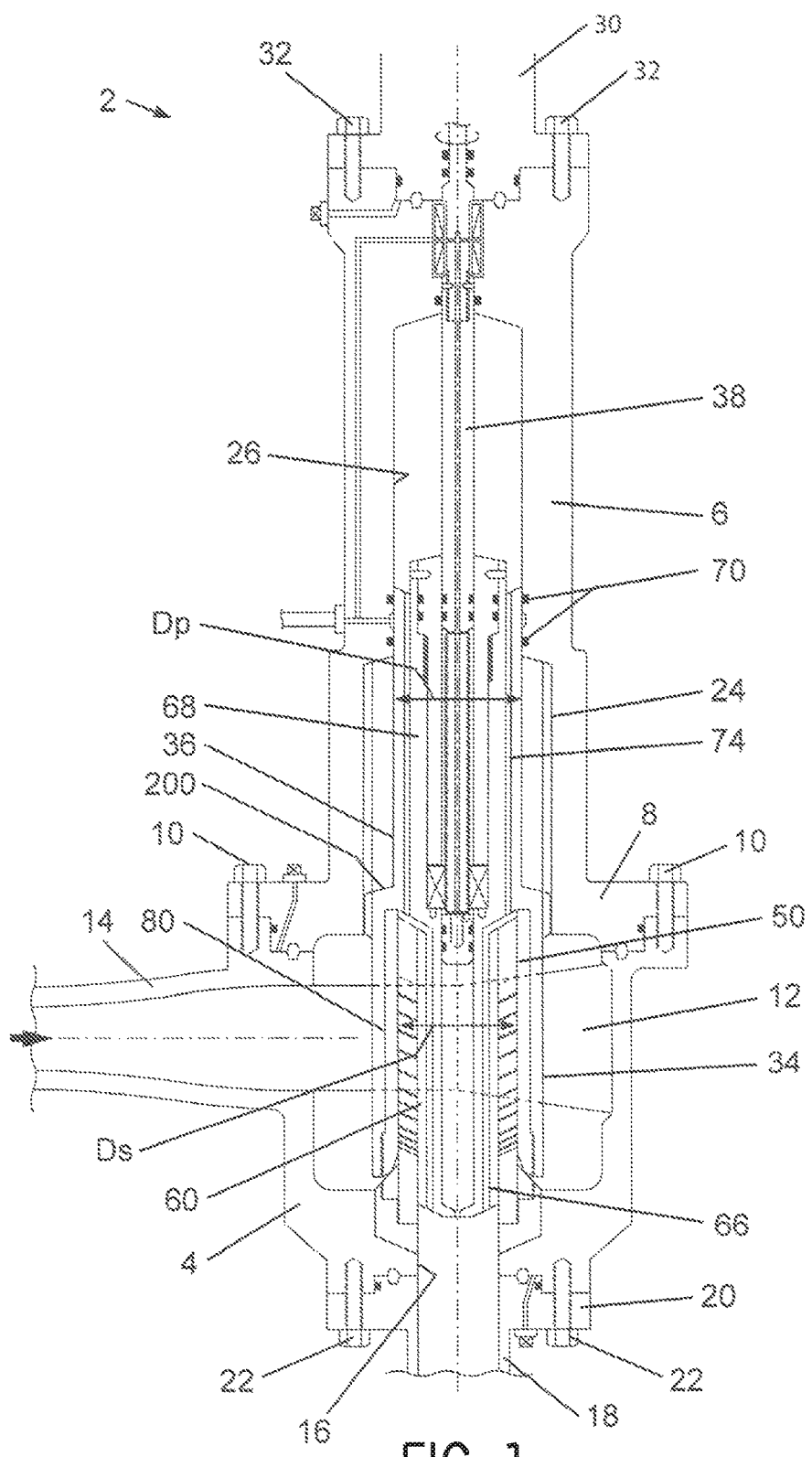
FIG. 1 is a cross-sectional view of a valve assembly according to a first embodiment of the present invention.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

It would be advantageous if an improved design of valve could be provided, in particular an improved design of a valve employing a plug and cage arrangement. It would be of particular advantage if the valve could provide a high efficiency in the control of fluid flowing through the valve at all positions of the valve between the fully closed position and the fully open position.

According to the present invention, there is provided a valve assembly comprising:

a valve housing;

an inlet for fluid entering the valve housing;

an outlet for fluid leaving the valve housing;

a flow control assembly disposed within the valve housing between the inlet and the outlet, whereby fluid entering the valve housing is caused to flow through the flow control assembly, the flow control assembly comprising:

a cage having apertures therethrough to provide passage for fluid passing from the inlet to the outlet, the cage having an outlet end, in use fluid flowing within the cage in a downstream direction towards the outlet;

a closure assembly moveable with respect to the cage to open or close each of the apertures through the cage, to thereby control the flow of fluid through the cage;

wherein the apertures in the cage extend through the cage at a first angle to the radial direction of the cage and at a second angle to the radial direction of the cage, such that, in use, fluid entering the cage through each aperture is directed into the cage at the first angle to the radial direction so as to flow around the interior of the cage and at the second angle to the radial direction of the cage so as to flow in the downstream direction towards the outlet end of the cage.

The valve assembly comprises a housing having an inlet for fluid and an outlet for fluid, with a flow control assembly disposed within the housing between the fluid inlet and fluid outlet. In one preferred arrangement, the valve assembly is arranged whereby all the fluid entering the housing through the inlet is caused to flow through the flow control assembly to the fluid outlet.

In a preferred arrangement, the housing comprises a cavity therein, the flow control assembly being disposed within the cavity, for example centrally, such that the cavity extends around the flow control assembly. In this way, fluid entering through the fluid inlet in the housing is caused to flow around the flow control assembly and enter the cage evenly from the cavity. In a preferred arrangement, to assist the even distribution of fluid within the cavity, the fluid inlet is arranged in the housing to extend tangentially to the walls of the cavity. It has been found that such an arrangement having a tangential entry provides an improved fluid control when using the sleeve/cage arrangement of the valve assembly of the present invention. In particular, by directing incoming fluid into the cavity at an angle, the direct impact of the fluid onto the portion of the flow control assembly facing the inlet is avoided. This prevents premature wear and failure of the flow control assembly, in particular in the case of an erosive fluid stream, such as one containing entrained solid particles, such as may be produced from a subterranean well from time to time. In addition, by having the fluid stream directed in the cavity around the flow control assembly, a more even flow of fluid through the flow control assembly is obtained, in turn improving the control of the fluid flowrate and/or pressure.

In a particularly preferred arrangement, the inlet has the form of an opening in the wall of the cavity, disposed to direct fluid into a channel or groove having the form of an involute and extending around the outer wall of the cavity. The channel or groove is preferably formed to have a progressively smaller cross-sectional area, in order to progressively introduce fluid into the cavity around the flow control assembly. In this way, an even distribution of fluid around the flow control assembly is obtained.

As noted, the valve assembly comprises an inlet and an outlet for fluid to enter and leave the valve housing. Between the inlet and the outlet is disposed a flow control assembly, operable to control the flow rate and/or pressure of fluid passing through the valve. The flow control assembly comprises a cage having apertures therethrough, through which fluid is caused to flow. The apertures are opened and closed by movement of the closure assembly, as described hereafter. In particular, the closure member is movable between a fully closed position, in which all of the apertures in the cage wall are covered by the closure assembly, and a fully open position in which all of the apertures in the cage wall are open or uncovered by the closure assembly. The control of the flow of fluid is obtained by selecting the number and/or size of apertures that are open for fluid passage.

The cage may have any suitable form, but is preferably in the form of a generally cylindrical tube, with apertures extending through the wall of the tube.

In use, fluid enters the interior of the cage through the apertures and flows to the fluid outlet. In this respect, the general direction of flow of fluid within the cage is in a downstream direction towards the outlet, that is the direction of flow of the bulk fluid. The fluid may deviate from this general bulk direction of flow within the cage, as described hereinafter. However, all fluid entering the cage through the apertures leaves the cage at its outlet end.

The apertures may extend through the wall of the cage and be arranged around the cage in any suitable pattern. Known patterns for the apertures include overlapping rows of apertures of different sizes. In one preferred arrangement, the apertures are arranged in a plurality of rows, each row containing one or more apertures, with adjacent rows being separated by a land or region having no apertures therethrough. This arrangement improves the accuracy of the control of fluid flow, by allowing the closure assembly, such as a plug or sleeve, to lie with its end face extending across the land, thereby leaving the apertures either fully open or fully closed, depending upon their position relative to the plug or sleeve. In addition, the option of having the end face of the plug or sleeve in a position where it does not extend across a partially open aperture allows the end face of the sleeve or plug to be protected from the stream of fluid passing through the aperture. In known arrangements, it is frequently the case that the end faces of plugs and sleeves are eroded by the streams or jets of fluid formed as the fluid passes through the apertures in the cage. These streams or jets can quickly erode the plug or sleeve, in particular eroding the surface of the plug or sleeve that contacts the seat in the fully closed position. This in turn reduces the ability of the plug or sleeve to form a complete seal to prevent fluid flow when fully closed. This effect is reduced or minimized by having the apertures arranged in rows, separated by lands, as described above.

The apertures in the cage of the valve assembly extend through the wall of the cage at a first angle to the radial direction of the cage. In this respect, the radial direction is to be taken as being a line extending normal to the inner surface of the cage and extending perpendicular to the central longitudinal axis of the cage. In particular, the first angle is an angle measured in a lateral plane of the cage extending perpendicular to the longitudinal axis of the cage, that is across the body of the cage.

The effect of having the apertures in the cage extend at the first angle to the radial direction is to direct fluid entering the cage through the apertures around the interior of the cage, so as to form a rotating or swirling fluid flow pattern around the inner surface of the wall of the cage. This is in contrast to known designs, in particular of chokes, in which the apertures extend radially through the cage wall, the result of which is to direct fluid entering the cage through the apertures directly at the center of the cage. This in turn results in the incoming fluid streams being subject to significant shear. In the case of such valves being used to process fluid streams having a plurality of fluid phases, this in turn results in a very high degree of mixing of the fluid phases. This is undesirable in the case of fluid streams being processed that are to be subjected to separation downstream of the valve assembly, such as is the case with fluid streams comprising oil, gas and/or water produced from subterranean wells. The fluid flow patterns generated within the cage of the valve assembly of the present invention are advantageously subjected to lower shear, as a result of being directed around the interior of the cage.

In general, a flow pattern within the cage giving rise to rotating fluid bands or impingement of the incoming jets of fluid gives rise to a significant back pressure, in turn creating a high fluid pressure drop across the valve from the inlet to the outlet. This effect is used when the valve is being used to control pressure, such as is the case with a choke assembly. Such an assembly may be classed as a pressure control device.

However, there is also a need to control the flow of fluid through the valve, that is have the valve perform as a flow control device. In this type of operation, the flow of fluid through the valve should occur via the easiest and smoothest path. The valve of the present invention is arranged to be a flow control device to control the flow of a fluid stream, for example to control the commingling of fluid from different sources upstream or downstream of a process system, such as a separator.

In the valve assembly of the present invention, the tangentially extending, downstream directed ports allow the fluid to follow a swirling flow pattern within the cage having a minimum of shear flow, eddie flow or cross-flow. By appropriate arrangement of the apertures in the cage, for example in a plurality of rows, a smooth flow control curve is achieved, that is the change in flow of fluid through the valve with changes in the position of the closure assembly is a smooth curve. In particular, the form of the apertures allows for the fluid jet entering the cage from one aperture to avoid overlapping the jet from an adjacent aperture, reducing the occurrence of fluid shear. Further, the jets from adjacent apertures can be spaced a minimum distance apart, reducing the occurrence of eddie flows.

It may be the case that a significant fluid pressure drop is required across the device, depending upon the processing requirements. The valve assembly of the present invention also allows for such a pressure drop to be achieved, but without significant fluid shear or eddie currents, as noted above. This is in contrast to known valve assemblies, such as butterfly valves, ball valves or gate valves.

The first angle may be any suitable angle to the radial direction. For example, the first angle may be at least 10° to the radial direction, more preferably at least 20°, still more preferably at least 30°. Preferably, the first angle is at least 45°, more preferably at least 60°, still more preferably at least 70° to the radial direction. In a particularly preferred embodiment, the first angle is such that the apertures open at a tangent to the inner surface of the wall of the cage.

Further, the apertures extending through the cage of the valve assembly of the present invention extend at a second angle, the second angle being an angle to the radial direction in the downstream direction within the interior of the cage. In particular, the second angle is at an angle to the lateral plane containing the first angle. The second angle is in a longitudinal plane extending perpendicular to the lateral plane.

The effect of having the apertures extending at the second angle to the radial direction is to direct the fluid entering the interior of the cage in a downstream direction within the cage. In particular, as a result of the combined effects of the apertures extending at the first and second angles, the incoming fluid is caused to flow in a spiral or helical pattern in the downstream direction within the cage.

The second angle may be any suitable angle to the lateral or radial direction. The apertures in the wall of the cage may extend at different second angles, for example depending upon their location in the wall. Preferably, all the apertures in the cage extend at the same second angle.

In a preferred embodiment, the second angle of the apertures is selected such that fluid entering the interior of the cage through a first aperture is guided around the interior of the cage at the first angle of the aperture to pass below the stream of fluid entering the cage through a second aperture adjacent the first and in the same lateral plane as the first aperture, as described in more detail hereinafter. In this respect, the term 'below' is a reference to a distance in the downstream direction within the interior of the cage. With the apertures arranged as in this embodiment, the spacing of adjacent apertures and the second angle of the apertures are related. In particular, with the apertures spaced further apart, the second angle can be reduced and still have the fluid stream from the first apertures pass below the adjacent second aperture. Similarly, a larger second angle is required if the apertures are spaced closer together.

Preferably, the second angle is at least 5°, more preferably at least 10°, still more preferably at least 15°. In many embodiments, a second angle of at least 20° is preferred. One preferred embodiment has the apertures extending at a second angle of 25°. A second angle in the range of from 10° to 40°, more preferably from 20° to 30°, has been found to provide an advantageous arrangement in terms of the number, size and arrangement of the apertures in the cage, together with providing an advantageous size of cage. For example, an angle of from 20° to 30° has been found to be particularly effective when the cage has a nominal internal diameter of 6 inches (about 150 mm).

The apertures in the wall of the cage may be of any suitable shape. In this respect, the term 'shape' refers to the cross-sectional form of the aperture taken along the outer or inner surface of the cage wall. Examples of suitable shapes include circular and elliptical. In a preferred embodiment, the apertures are quadrilateral in shape. For example, the apertures may be rectangular in shape. It has been found that a rectangular shape for the apertures provides an advantageous fluid flow pattern within the cage. However, with the cage being cylindrical in shape, the curved wall of the cage increases the dimensions of the aperture in the longitudinal direction of the cage. This in turn increases the length of the cage and, as a result, the overall size of the assembly to accommodate the increased cage length. In particular, an increase in the length of the cage requires a corresponding increase in the distance the closure assembly, is required to be moved within the cage and, hence, the length of the actuator mechanism.

It has been found that this effect can be reduced or eliminated if the shape of the apertures deviates from a rectangle. Accordingly, in a preferred arrangement, the apertures are in the shape of a parallelogram. More preferably, the apertures are rhomboidal in shape. It has been found that rhomboidal apertures allow the required area of the apertures to be maintained, without a significant increase in the overall size of the apertures and a resultant increase in the length of the cage.

The angle between the sides of the parallelogram apertures will be determined by such factors as the second angle of the aperture. For example, an aperture having four equal sides of 2.5 cm (1.0 inch) and extending at a second angle of 25°, with four apertures in a row in a cage of nominal diameter of 15 cm (6 inches) has an angle between the sides of about 48°. The angle of the parallelogram is preferably selected to form a rectangular opening of the aperture in the interior wall of the cage. In this way, the apertures may be arranged in rows with lands therebetween, according to a preferred embodiment of the present invention.

As noted above, the cage is generally cylindrical, having a wall that is curved in the circumferential direction. In order to provide the optimum flow pattern of fluid entering the cage through the apertures, it is preferred to accommodate the curvature of the cage wall by providing the upstream and/or downstream edges of the aperture with a corresponding curve. Preferably, both the upstream and downstream edges (hereinafter the 'upper' and 'lower' edges) are curved. This arrangement provides the cage with the shortest length, for a given number and size of apertures. Accordingly, the apertures may be rectangular, having upper and lower curved edges, more preferably a parallelogram shape having curved upper and lower edges. It is particularly preferred for the apertures to be rhomboidal in shape with upper and lower curved edges. With the upper and lower edges of the aperture curved in the aforementioned manner, the fluid stream entering the interior of the cage through the aperture is generally rectangular in form.

As noted above, the apertures may be arranged in the cage wall in any suitable pattern, with the apertures arranged in rows being preferred, more preferably with a land having no apertures therein provided between adjacent rows of apertures in the cage. As also noted above, each aperture in the cage extends at a first and a second angle. At least some of the apertures in the cage are preferably arranged, in terms of their first and second angles, and their arrangement around the wall of the cage such that the fluid stream entering the cage through one aperture flows at least partially below the adjacent aperture in the same row in the direction of flow within the cage. More preferably, the fluid flow entering the cage through one aperture passes wholly below the adjacent aperture in the same row in the direction of fluid flow within the cage. This arrangement is particular effective when the apertures are arranged in rows with lands therebetween, as in a preferred embodiment of the present invention. In this respect, the term 'below' is a reference to the longitudinal direction of fluid flow within the cage or the downstream direction. In this way, the fluid flowing within the cage is subjected to reduced shear within the cage. This is of advantage when the assembly is being used to process multiphase fluid streams, for example gas/liquid, liquid/liquid or gas/liquid/liquid fluid streams. The reduction in fluid shear within the cage helps to prevent the different fluid phases becoming more highly dispersed. This is of particular advantage when the fluid stream is to be subjected to a separation process downstream of the valve assembly, such as a gas/liquid or liquid/liquid separation. This aspect is particularly advantageous when processing fluid streams produced from a subterranean well, for example gas/oil streams, water/oil streams or gas/water/oil fluid streams, which are to be separated into separate gas, water and/or oil phases.

The cage may comprise apertures of a single size, that is all the apertures have the same cross-sectional area providing the area of the aperture through which the fluid stream flows upon entering the cage. More generally, the cage comprises apertures of a plurality of different sizes. In such an arrangement, the apertures are preferably arranged such that the apertures first opened when the closure assembly is moved from the fully closed position are smaller in size than the apertures opened subsequently, as the closure assembly moves further to fully open position.

In one embodiment, the first apertures opened by the closure assembly as it moves from the fully closed position are arranged as described above, that is successive apertures opened are greater in size or cross-sectional area. It has been found that the aperture size can reach an optimum for a given internal diameter of the cage. Once the apertures opened by the closure assembly have reached this optimum size, it is preferred that all remaining apertures to be opened have the same, optimum size.

The apertures are preferably of a size and arrangement along the length of the cage such that a movement of the closure member in the longitudinal direction a given distance results in a corresponding given change in the volume flowrate of fluid entering the cage, regardless of the position of the closure member with respect to the cage.

As noted above, the apertures are preferably arranged in discrete rows, more preferably with a land between adjacent rows of apertures. Each row may comprise any suitable number of apertures. The number of apertures in a given row will depend upon such factors as the size of the apertures required at that position in the wall of the cage, the second angle of the apertures, and the internal diameter of the cage. Examples of the number of apertures in a given row in the cage wall are 2, 4, 6 or 8. Higher numbers of apertures may be employed, in particular for smaller size apertures and/or larger cage diameters. In one preferred embodiment, the number of apertures in all the rows of the cage is the same, with 4 apertures per row being particularly preferred. In an alternative preferred embodiment, the first rows of apertures to be opened by the closure member when moving from the fully closed position have fewer apertures than the rows to be opened thereafter. For example, the first rows to be opened may have 2 apertures, with the number of apertures in each row increasing to 4 in successive rows.

The apertures may be arranged in the same position in each row, such that a plurality of apertures from different adjacent rows lie on the same longitudinally extending line of the cage wall. More preferably, the apertures in adjacent rows are staggered or offset in the circumferential direction from one another, such that apertures in adjacent rows do not lie on the same longitudinally extending line of the cage wall.

It has been found that a particularly advantageous flow pattern of fluid within the cage is obtained when the apertures in the cage wall are arranged in a helical pattern. The wall of the cage may comprise apertures extending in a single helix or, more preferably in a plurality of helices from the upstream end of the cage to the downstream end of the cage. A particularly preferred arrangement has the apertures arranged in both rows and in a helical pattern, such that each aperture may be considered to lie in a row of one or more apertures and a helix of a plurality of apertures.

In one preferred arrangement, the apertures increase in size from the downstream end of the cage to the upstream end of the cage. Such arrangements of apertures are discussed above. In this arrangement, each helix of apertures comprises a plurality of apertures increasing in size from the downstream end of the cage to the upstream end of the cage.

The helical arrangement of apertures allows for the most efficient use of the wall of the cage. Further, as the closure assembly is moved relative to the cage, the portion of the closure assembly that is cutting an aperture changes as the position of the closure assembly changes. This in turn reduces the rate of wear of the closure assembly, by distributing the erosive effect of fluid flow more evenly around the closure assembly surface.

As noted, the apertures extend at a first angle through the cage wall. As a result, the fluid enters the interior of the cage at an angle and follows an angular flowpath within the cage. The angular flowpath may be considered to have an upstream direction, that is the direction at the angle at which the fluid flowpath extends from the aperture within the cage. The edges of the aperture may be considered in relation to these upstream and downstream directions. Each aperture may be considered to comprise a leading edge, that is the edge of the aperture that is downstream in the direction of fluid entering the cage through the aperture, and a lee edge, that is the edge that is upstream of the fluid entering through the aperture.

In one preferred helical arrangement, the apertures in the helix are arranged such their leading edges lie on a single helical line extending on the interior surface of the cage wall. This arrangement has the benefit of reducing the shear generated by the fluid streams entering the cage on the fluid flowing within the cage. This arrangement is particularly advantageous when the apertures are comparatively large.

However, it has been found that the above arrangement can provide dead spaces within the cage around the smaller apertures. For comparatively small apertures, it is preferred that the apertures in a helix are arranged to have their lee edges lying on a single helical line extending on the interior surface of the cage wall.

In embodiments in which there is a large difference in the size of apertures in the cage, for example with small apertures being provided at the downstream end of the cage and significantly larger apertures being provided at the upstream end of the cage, the apertures may be arranged in a helical pattern such that a first group of larger apertures has their leading edges lying on a single helical line and a second group of smaller apertures has their lee edges lying on a single helical line. It is preferred, however, that all the apertures in the cage are arranged in the same manner, that is to have either their leading edges or their lee edges aligned as described above.

The valve assembly of the present invention further comprises a closure assembly. The closure assembly is moveable with respect to the cage to open and close the apertures in the cage wall by uncovering or covering the apertures, respectively. Generally, the cage is fixed within the valve assembly and the closure assembly is moveable. The closure assembly may comprise a first closure member and/or a second closure member.

The first closure member, if employed, is disposed within the cage and is moveable with respect to the cage and the apertures extending through the wall of the cage. The first closure member acts to open or close the apertures by closing and sealing the inner end of each aperture. The first closure member is moveable between a first or closed position, in which it obscures and closes all the apertures in the cage, and a second or open position, in which it overlies and obscures none of the apertures in the cage. The first closure member may be positioned between the first and second positions, such that a portion of the apertures are open for the passage of fluid therethrough, and the remainder of the apertures are closed to the flow of fluid. The flow of fluid through the valve assembly may thus be controlled by the appropriate position of the first closure member.

The first closure member may have any suitable form. For example, in the case of a generally cylindrical tubular cage, the first closure member may be a cylindrical sleeve or a cylindrical plug, the outer diameter of which corresponds to the inner diameter of the cage.

The first closure member is preferably a plug. The plug has an end surface that extends across the cage. When the plug is in a position with respect to the cage that one or more apertures are open, the end surface of the plug provides a boundary for a fluid flow path extending from the inlet of the valve assembly, through the open apertures in the cage to the outlet of the valve assembly. The end surface may act to seal the valve by contacting a seat in the valve assembly, when the valve is closed, with the plug covering all the apertures in the cage and preventing fluid flow through the valve.

The end surface of the plug may be any suitable shape or configuration. In one embodiment, the end surface is flat, preferably extending perpendicular to the wall or walls of the cage and the side wall or walls of the plug. The plug may be formed with a shoulder extending between the end surface and the side wall of the plug. In a preferred arrangement, the end portion of the plug is provided with a conical surface, such that the end surface of the plug is at least frusto-conical. In this way, the conical surface of the plug cooperates with the second angle of the apertures in directing the flow of fluid through the apertures adjacent the end of the plug within the cage. The angle of the conical surface of the plug may be any suitable angle to direct the flow of fluid within the cage into the desired pattern. Preferably, the conical surface of the end of the plug corresponds to the second angle of the apertures, that is the conical surface extends at an angle to the lateral plane of the cage of the second angle +/−10°, more preferably +/−5°. Preferably, the conical surface extends at an angle to the lateral plane of the cage substantially the same as the second angle of the apertures. In one embodiment, the end portion of the plug has streamline end surface, that is a generally conical form with the conical surface being concave. The angle of the concave conical surface at its radially outer portion is preferably the same as the second angle of the aperture, with the radially inner portion of the conical surface extending at a greater angle.

The second closure member, if employed, is disposed outside the cage and is moveable with respect to the cage and the apertures extending through the wall of the cage. The second closure member acts to open or close the apertures by closing and sealing the outer end of each aperture. The second closure member is moveable between a first position, in which it obscures and closes all the apertures in the cage, and a second position, in which it overlies and obscures none of the apertures in the cage. The second closure member may be positioned between the first and second positions, such that a portion of the apertures are open for the passage of fluid therethrough, and the remainder of the apertures are closed to the flow of fluid. The flow of fluid through the valve assembly may thus be controlled by the appropriate position of the second closure member.

The second closure member may have any suitable form. For example, in the case of a generally cylindrical tubular cage, the second closure member may be a cylindrical sleeve, the inner diameter of which corresponds to the outer diameter of the cage.

The first and second closure members, if both present in the closure assembly, may be moved independently from one another, relative to the cage. In this case, the valve assembly will further comprise an actuator assembly for each of the first and second closure members. In a preferred arrangement, the first and second closure members are moved together, preferably by being connected to one another, by a single actuator assembly.

Both the first and second closure members may be used to control the flow of fluid through the valve assembly. In one arrangement, the first and second closure members are sized relative to one another and the cage that, when moved together, at a given position of the closure assembly, the first and second closure members are closing the same apertures through the cage wall and leaving the same apertures open for fluid flow. In other words, a given aperture will either be open at both its inner and outer ends or will be closed at both its inner and outer ends. In one embodiment, with the apertures formed to have a cross-section in the form of a parallelogram, the second closure member only partially closes the opening of the apertures in the outer wall of the cage wall, while the first closure member closes the entire opening on the inner wall surface.

The closure assembly is moved by means of an actuator. Actuator systems suitable for use in the valve assembly of the present invention are known in the art and include a range of reciprocating actuator systems. The actuator system may be operated electrically or hydraulically or by a combination of the two. Again, such systems are known in the art. High powered actuators may be required to cover the range of pressure differentials experienced by the valve assembly, in particular when the assembly is used in subsea environments and is exposed to either high external hydrostatic pressures with low internal pressure or high internal pressure and low external fluid pressure.

The closure assembly may be connected to the actuator system by a shaft. This is particularly advantageous as it allows the actuator module itself to be mounted on the exterior of the valve assembly, so that it may be serviced and or removed without requiring the entire valve assembly to be disassembled. Such an arrangement is also known in the art. The actuator may be arranged to move the shaft longitudinally, such that the shaft reciprocates, together with the respective closure members. Such an arrangement is well known in the art and suitable reciprocating actuator assemblies are commercially available. In a particularly preferred arrangement, the closure members are moved by one or more shafts that transfer drive from the actuator system to the closure assembly by rotation of the shaft or shafts, as opposed to the conventional reciprocating motion. In the preferred embodiment, with the first and second closure members extending from a single support member, a single shaft is required to move the support member and the two closure members. The shaft may be connected to the support member in any suitable way to translate rotational movement of the shaft into internal longitudinal movement of the closure members with respect to the tubular cage. A particularly suitable means for transferring the drive is to provide a portion of the length of the shaft with a thread that engages a ball screw nut held captive in the support member.

In operation, the fluid stream to be controlled is introduced through an inlet in the valve assembly. Preferably, the inlet introduces the fluid stream into an annular cavity extending around the outside of the flow control assembly. With the flow control assembly in the fully closed position, the closure assembly is fully extended with respect to the cage. In this position, all the apertures extending through the wall of the cage are covered and closed by the closure assembly, thus preventing fluid from flowing to the outlet of the valve assembly. As the closure assembly is moved with respect to the cage from the closed position, the end surface of each closure member is moved away from its seat. As the end surface of each closure member passes the portion of the cage with apertures therethrough, the apertures are opened and fluid is allowed to flow through the wall of the cage to the outlet of the valve assembly. The extent of fluid flow is controlled by appropriate positioning of the closure assembly with respect to the cage. As the closure assembly is moved towards the fully open position, increasing numbers of apertures are uncovered and the cross-sectional area available for fluid flow increases.

In practice, it may be difficult to have first and second closure members seating at the same time. Accordingly, it may be preferred to have the first closure member free and not engage a seat, while the second closure member is provided with a seat against which it can seal. In this way, the fluid pressure is acting solely to seal the second closure member against its seat. This can provide an improved fluid seal.

In general, it is advantageous to employ programmable actuators for valve assemblies. Programmable actuators allow the pressure and flowrate of the fluid stream to be continuously controlled and adjusted, ensuring that the pressure/flow system functions accurately within the design limits. An actuator to move the closure assembly both rapidly and accurately will allow the process hardware to be designed and constructed with higher tolerances and with less float or fluctuation tolerance volume, allowing the separation hardware to be more compact.

The present invention has been described in terms of a complete valve assembly. However, it will be appreciated that the particular arrangement of the cage of the valve assembly may be provided as a separate component, for example for use in repairing or refitting existing valve assemblies of conventional design.

Accordingly, the present invention further provides a cage assembly for use in a fluid valve assembly, the cage assembly comprising:

a cage wall having apertures therethrough to provide passage for fluid passing from the exterior of the cage to the interior of the cage through the cage wall, the cage having a longitudinal axis;

wherein the apertures in the cage extend through the cage at a first angle to the radial direction and at a second angle to the longitudinal axis of the cage, such that, in use, fluid entering the cage through each aperture is directed into the cage at an angle to the radial direction and at an angle to the longitudinal axis in the downstream direction.

Features of the cage and, in particular, the apertures in the cage wall, are as hereinbefore described.

As noted above, in one preferred arrangement, the plurality of apertures in the cage are arranged to extend in one or more helices. This arrangement of the apertures in the cage of a valve assembly has been found to be particularly advantageous in a general respect to cages having a plurality of apertures therein.

Accordingly, in a further aspect, the present invention provides a valve assembly comprising:

a valve housing;

an inlet for fluid entering the valve housing;

an outlet for fluid leaving the valve housing;

a flow control assembly disposed within the valve housing between the inlet and the outlet, whereby fluid entering the valve housing is caused to flow through the flow control assembly, the flow control assembly comprising:

a cage having apertures therethrough to provide passage for fluid passing from the inlet to the outlet, the cage having an outlet end, in use fluid flowing within the cage in a downstream direction towards the outlet;

a closure assembly moveable with respect to the cage to open or close each of the apertures through the cage, to thereby control the flow of fluid through the cage;

wherein the plurality of apertures in the cage are arranged in one or more helices extending along the cage.

Features of the valve assembly and, in particular, the apertures in the cage wall, are as hereinbefore described.

In a still further aspect of the present invention, there is provided a cage assembly for use in a fluid valve assembly, the cage assembly comprising:

a cage wall having apertures therethrough to provide passage for fluid passing from the exterior of the cage to the interior of the cage through the cage wall, the cage having a longitudinal axis;

wherein the plurality of apertures in the cage are arranged in one or more helices extending along the cage.

Again, features of the cage and, in particular, the apertures in the cage wall, are as hereinbefore described.

The valve assembly of the present invention finds use generally in the control of fluid streams, in particular the control and regulation of the fluid pressure or flowrate. The valve assembly finds particular use in the control of fluid streams produced from subterranean wells, in particular multiphase fluid streams, for example comprising two or more of oil, water, gas and entrained solids.

Accordingly, there is also provided a wellhead assembly for a subterranean well comprising a valve assembly as hereinbefore described. The wellhead assembly may be at a subsea location.

Referring to FIG. 1, there is shown a valve assembly, generally indicated as 2, according to a first embodiment of the present invention. The valve assembly 2 comprises a generally cylindrical lower housing 4 and a generally cylindrical upper housing 6. The upper housing 6 has a flange 8 formed around its lower end portion, allowing the upper housing 6 to be mounted to the lower housing 4 by means of bolts 10 in a conventional manner.

References herein to 'upper' and 'lower' are used for the purposes of ease of identification of components in the accompanying figures and are used in relation to the orientation of the apparatus shown in the figures only, it being understood that the assemblies of the present invention may be used in any appropriate orientation and need not be limited to operation in the orientation shown in the accompanying drawings.

The lower housing 4 comprises a generally cylindrical flow chamber 12 formed therein and has an inlet 14 for fluid and an outlet 16 for fluid. The inlet 14 has a generally circular cross-section in its upstream portion, with a smooth transition portion to a generally rectangular feed section in its downstream portion immediately before the opening into the flow chamber 12. The inlet 14 is arranged laterally to open in the side of the flow chamber 12, as shown in FIG. 1, while the outlet 16 is arranged axially in the lower portion of the lower housing 4, as also shown in FIG. 1. Fluid to be processed by the valve assembly 2 is led to the inlet 14 by a conventional pipe (not shown for clarity). The processed fluid is led away from the outlet 16 through a conventional pipe 18, mounted to the lower portion of the lower housing by means of a flange 20 and bolts 22, again of conventional design.

The upper housing 6 comprises a first, generally cylindrical chamber 24 therein in its lower region which opens into the flow chamber 12 in the lower housing 4. The upper housing 6 further comprises a second, generally cylindrical chamber 26 therein in its upper region. The second chamber 26 is sealed from the first chamber as described hereinafter. An actuator assembly 30, of known design and commercially available, is mounted to the upper end of the upper housing 6 by bolts 32, in conventional manner. The actuator assembly 30 may comprise any suitable form of actuator, for example a hydraulic, electro-hydraulic or electric actuator. Electric actuators are preferred.

The valve assembly 2 further comprises a flow control assembly, generally indicated as 34, disposed within the flow chamber 12 of the lower housing, the flow control assembly 34 having a closure assembly, generally indicated as 36. Components of the closure assembly 36 extend into the first chamber 24 in the upper housing 6 and into the second chamber 26 of the upper housing 6. The closure assembly 36 is sealed to the interior of the upper housing 6 at the junction between the first and second chambers 24, 26. Details of the flow control assembly and the closure assembly are described hereinafter.

A shaft 38 extends from the actuator assembly 30 and connects with the upper end of the closure assembly 36, further details and the operation of which are provided herein below.

Figure 2:
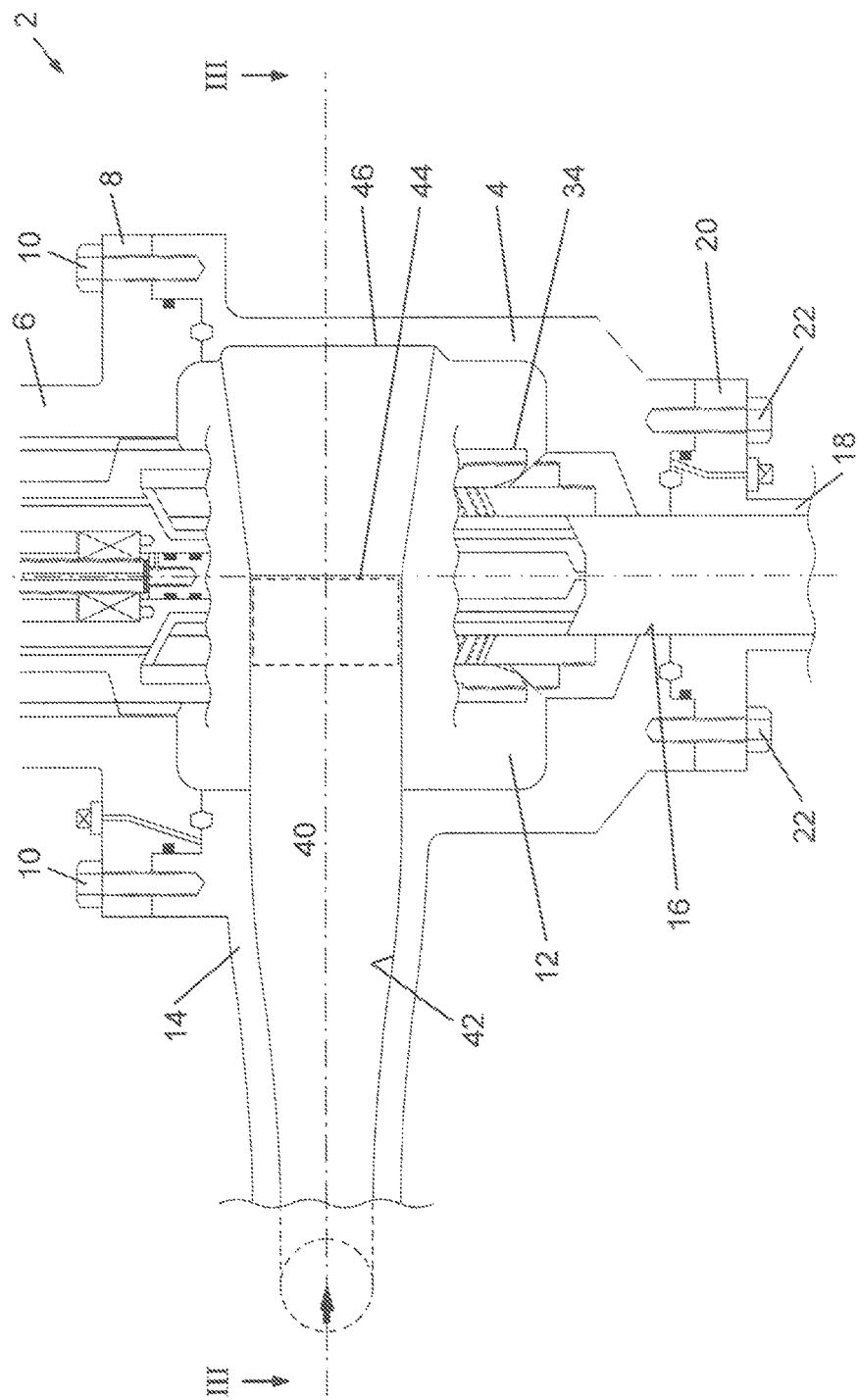
FIG. 2 is a cut-away, cross-sectional view of the lower housing of the valve assembly of FIG. 1.

As noted above, the fluid inlet 14 to the flow chamber 12 of the lower housing 4 is disposed in the side of the lower housing, so as to direct incoming fluid laterally into the flow chamber 12. Referring to FIG. 2, there is shown a cut-away cross-sectional view of the lower housing 4, with a portion of the flow control assembly 34 removed, to show details of the fluid inlet arrangement of the flow chamber 12. A diagrammatical cross-sectional view along the line III-III of FIG. 2 is shown in FIG. 3.

Referring to FIG. 2, the inlet 14 is arranged to have an inlet passage 40 extending tangentially into the flow chamber 12. The inlet 14 is formed to provide the inlet passage 40 with a generally circular feed portion 42, and a generally rectangular orifice 44, indicated by a dotted line, opening into the flow chamber 12. The inlet passage 40 is arranged to open at the orifice 44 tangentially to the inner wall of the lower housing 12. In this way, fluid entering the flow chamber 12 through the inlet passage is caused to flow in a circular pattern within the flow chamber 12. This has the effect of distributing the fluid around the flow control assembly 34 within the flow chamber 12. This has a number of advantageous effects. First, the incoming fluid is not caused to directly impinge upon the outer surfaces of the flow control assembly 34, as is the case with known and conventional plug-and-cage choke designs. This in turn prevents damage to the flow control assembly 34 arising from the impact of entrained solid materials and particles. Second, introducing the fluid into the flow chamber 12 tangentially allows the fluid to flow in a lower shear regime that is possible with the conventional and known arrangements, in which the incoming fluid is directed orthogonally at the plug-and-cage assembly. This in turn reduces the effects to which the various phases in the fluid stream are mixed, perhaps undoing earlier separation that may have occurred in the process lines and equipment upstream of the valve assembly. Further, the circular or rotating flow pattern within the flow chamber 12 induces separation of the different phases within the fluid stream, according to the respective densities of the phases. Further, the arrangement shown in the figures ensures that the incoming fluid stream is evenly distributed within the flow chamber 12 around the flow control assembly. This in turn increases the effectiveness and efficiency of the flow control assembly in controlling the flowrate and/or pressure of the fluid stream.

The inner wall of the lower housing 4 defining the flow chamber 12 is formed with a channel 46 therein. The channel 46 is aligned with the orifice 44 and forms an involute path for fluid entering the flow chamber 12. The channel 46 is extends circumferentially around the flow chamber 12, as shown in FIG. 3. The channel 46 decreases in cross-sectional area, travelling in the circumferential direction away from the orifice 44, that is the path followed by the incoming fluid stream. In this way, the fluid stream is encouraged gradually to enter the central region of the flow chamber 12 and flow towards the centrally located flow control assembly 34.

Details of the cross section of the channel 46 are shown in FIGS. 4a, 4b, 4c and 4d at the positions A, B, C and D of FIG. 3, respectively. As can be seen, the cross-sectional area of the channel 46 decreases in the direction of fluid flow circumferentially away from the inlet orifice 44. This reduction in cross-sectional area of the channel 46 ensures that fluid leaves the channel as it travel circumferentially around the flow chamber 12, as noted above. This reduction in cross-sectional is achieved in the embodiment shown in FIGS. 2 and 3 by having the depth of the channel 46 decrease in the direction extending circumferentially away from the orifice 44. However, in the embodiment shown, this reduction in depth is accompanied by an increase in the width of the channel in the longitudinal direction of the lower housing 12. This increase in width has the effect of distributing the fluid stream longitudinally within the flow chamber 12. This in turn ensures that the flow control assembly has an even exposure to the fluid stream to be controlled. The reduction in cross-sectional area of the channel 46 is preferably gradual or progressive, as shown in FIGS. 2 and 3. In the embodiment shown, the cross-sectional area reduces by 25% for each 90° of turn of the fluid stream. Thus, if the cross-sectional area of the orifice 44, as shown in FIG. 4a is A, the cross-sectional area of the channel at the positions shown in FIGS. 4b, 4c and 4d is 0.75 A, 0.5 A and 0.25 A, respectively.

Figure 5:
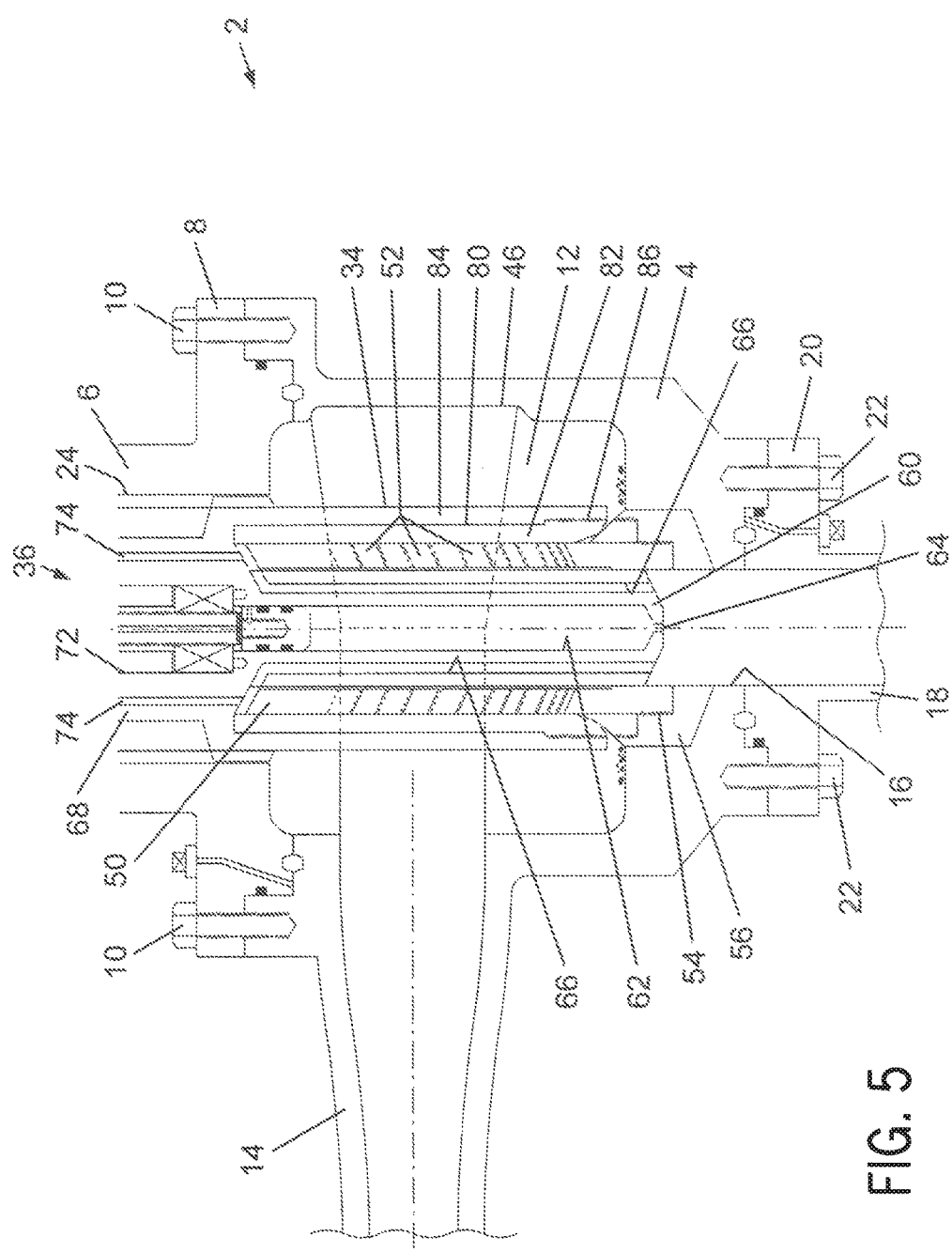
FIG. 5 is a cross-sectional view of the lower housing of the valve assembly of FIG. 1, showing the flow control assembly therein.

Referring to FIG. 5, there is shown a vertical cross-sectional view of the lower housing 4 of the valve assembly 2 of FIG. 1, showing the flow control assembly 34. The flow control assembly 34 comprises a cage 50 formed as a generally cylindrical tube extending longitudinally within the flow chamber 12. The cage 50 has a plurality of apertures 52 extending therethrough, details of which are described herein below. The cage 50 has its lower end portion formed with a thread 54 on its outer surface. The cage 50 is mounted within the flow chamber 12 by being screwed into a threaded boss 56 inserted into the lower end wall of the lower housing 12 adjacent the fluid outlet 16. The interior of the cage 50 is in fluid flow communication with the fluid outlet 16 by means of a bore formed in the boss 56, such that fluid flowing through the apertures 52 in the cage 50 and entering the interior of the cage 50 may leave the valve assembly through the outlet 16.

The flow control assembly 34 further comprises a closure assembly 36. The closure assembly 36 comprises a plug 60 extending within the central bore of the cage 50. The plug 60 is machined to be a close fit with the inner walls of the cage 50 and is slideable longitudinally within the cage 50, as will be described hereinafter. The plug 60 is generally cylindrical, having a longitudinal bore 62 formed therein. The bore 62 is open to the interior of the cage 50 by virtue of a small diameter bore 64 formed in the end of the plug 60. In this way, fluid within the bore 62 is able to leave the plug 60, thus preventing a hydraulic lock occurring.

A plurality of balancing bores 66 extending longitudinally through the plug 60. Each balancing bore 66 opens into the interior of the cage 50. The balancing bores 66 are features of the fluid balancing system in the valve assembly, details of which are described herein below.

The plug 60 is shown in the fully closed position in FIGS. 1 and 5, that is the plug 60 extends within the cage 50 and covers or obscures the inner ends of all the apertures 52 in the cage 50. It will be noted that the lower or free end of the plug 60 extends within the boss 56, that is a significant distance past the lowest apertures 52 in the cage 50.

The plug 60 depends at its upper end from the lower end of a generally cylindrical piston 68. The piston 68 extends upwards from the top of the cage 50, through the first chamber 24 in the upper housing 6 and into the second chamber 26, as shown in FIG. 1. The non-rotatable piston 68 engages with grooves in the wall of the first chamber 24 and is moveable longitudinally within the upper housing 6, that is vertically as shown in FIG. 1, in association with the plug 60. Seals 70 are disposed in the inner wall of the upper housing 6 at the junction between the first chamber 24 and the second chamber 26. The seals 70, of conventional or known configuration, allow the longitudinal movement of the piston 68 within the first and second chambers, but prevent fluid from passing between the first and second chambers 24, 26. The piston 68 has a central longitudinal bore 72 communicating with the bore 62 in the plug 60 at its lower end and opening into the second chamber 26 at its upper end, to receive the shaft 38. A plurality of fluid balancing bores 74 extend longitudinally within the piston 68, the lower end of each balancing bore 74 communicating with a corresponding balancing bore 66 in the plug 60, and the upper end of each fluid balancing bore 74 opening into the second chamber 26 within the upper housing 6.

The closure assembly 36 further comprises a sleeve assembly 80. The sleeve assembly 80 is generally cylindrical and extends from the lower end of the piston 68 around and along the outer surface of the cage 50 such that the sleeve assembly 80 can obscure and cover the outer ends of the apertures 52 in the cage. The sleeve assembly 80 is formed to be a close fit around the exterior surface of the cage 50, while still allowing the sleeve assembly 80 to move longitudinally with respect to the cage 50. The sleeve assembly 80 comprises an inner sleeve 82 and an outer sleeve 84, both generally cylindrical in form. The outer sleeve 84 is unitary with the piston 68. The inner sleeve 82 extends within the outer sleeve and is retained by a connection 86 at their respective lower ends. This arrangement allows the inner sleeve 82 to be formed from tungsten and the outer sleeve 84 to be formed from stainless steel.

By being attached to the piston 68, the sleeve assembly is moveable both with the piston 68 and the plug 60. In particular, the sleeve assembly 80 moves together with the plug 60 under the action of the actuator assembly 30. The control of the flow of fluid through the apertures 52 of the cage 50 is determined by the positions of the plug 60 and sleeve assembly 80 with respect to the cage. As shown in the figures, the plug 60 extends a greater distance from the end of the piston 68 than the sleeve assembly 80. This arrangement in turn provides the plug 60 and the sleeve assembly 80 with different functions. In particular, in the arrangement shown, the sleeve assembly 80 primarily acts as a flow shut-off member, that is to ensure that the flow of fluid is prevented, when the assembly is in the fully closed position, as shown in FIG. 5, for example. When the assembly has been moved from the fully closed position shown, the control of the flow of fluid through the cage 50, and hence through the entire assembly, is primarily controlled by the plug 60.

In order to perform the function of a flow shut-off member, that is prevent the flow of fluid through the assembly, the sleeve assembly 80 is provided with a sealing arrangement at its lower end, that is the end distal of the piston 68. Referring to FIG. 6, there is shown an enlarged view of a portion of the flow control assembly 34 of FIG. 1, in particular showing the lower or distal end of the sleeve assembly 80. A seating ring 90 is mounted in the boss 56 by a threaded connection 92 and extends around the cage 50. The seating ring 90 is formed from a seating material to allow a ridge on the closure member to bed in. A seating surface 94 is formed by the surfaces of the boss 56 and the seating ring 90 exposed within the flow chamber 12. As can be seen in FIG. 6, the seating surface 94 extends at an angle to the radial direction, such that it slopes away from the free end of the sleeve assembly 80. The action of the angled seating surface is twofold. First, by being angled, debris is prevented from collecting on the seating surface and stopped from preventing a fluid-tight seal being formed between the sleeve assembly 80 and the seating surface. Rather, solid particles and debris are collected in the lower region of the flow chamber 12, as viewed in FIG. 6, around the base of the cage. Second, the angle of the seating surface 94 cooperates with the surfaces on the end of the sleeve assembly 80 to be self-sharpening, as is described herein below.

The seating surface 94 cooperates with the end portion of the sleeve assembly 80. As shown in FIG. 6, the free or distal end of the outer sleeve 84 is finished perpendicular to the longitudinal axis of the sleeve assembly, plug and cage. The distal end of the inner sleeve 82 is formed with a compound surface comprising a first surface portion 96 radially outwards of a second surface portion 98. The first surface portion 96 extends at an angle to the radial direction that is more acute than the angle of the seating surface 94. The second surface portion 98 extends at an angle to the radial direction that is more obtuse than the angle of the seating surface 94. The first and second surface portions 96, 98 meet at a ridge 100. The details of the seating surface 94 and its cooperation with the surfaces at the distal end of the sleeve assembly 80 are shown in FIG. 7.

In operation, the ridge 100 is forced by the actuator assembly 30 into contact with the seating surface 94 of the seating ring 90, as the flow control assembly is moved into the fully closed position, shown in FIGS. 6 and 7. Contact between the ridge 100 and the seating surface 94 forms a fluid-tight seal. Depending upon the force exerted by the actuator assembly 30, the ridge 100 is caused to slide along the seating surface 94, due to the angle of the seating surface 94. This sliding action causes the ridge 100 and seating surface 94 to bed in, in particular to wear and removes pits, marks and blemishes in the surfaces, which may prevent a proper fluid seal from being formed. In addition, the action of the actuator assembly 30 moving the sleeve assembly 80 in the longitudinally downwards direction, as viewed in FIGS. 6 and 7, results in a force being exerted on the ridge 100 and the distal end of the sleeve assembly 80 by the seating surface 94, as indicated by arrow P in FIG. 7. This force, normal to the seating surface 94, has a radially outwards component, which induces a hoop stress in the distal end portion of the sleeve assembly 80. The action of the hoop stress is to force the ridge 100 radially outwards, against the seating surface 94, as indicated by arrows P in FIG. 7. This in turn increases the effectiveness of the seal formed between the ridge 100 and the seating surface 94. In particular, high hoop stresses can be generated, in turn causing the ridge 100 to bed into the seating surface 94.

As noted above, the plug 60 and sleeve assembly 80 extend different longitudinal distances from the piston 68 and with respect to the cage 50. The closure assembly 36 is moveable between a fully closed position, as shown in FIG. 6, for example, to a fully open position. In the fully closed position, the sleeve assembly 80 is sealed against the seating surface 94, as described above and shown in detail in FIG. 7. The plug 60 extends longitudinally within the cage 50, with its free end extending beyond the seating surface 94, as shown in FIG. 6. In the fully closed position, the plug 60 and the sleeve assembly 80 cover and obscure the inner and outer ends of the apertures 52 in the cage 50, respectively, thus preventing fluid flow through the assembly 2. With the closure assembly in the fully open position, both the inner and outer ends of all the apertures 52 in the cage 50 are uncovered and open, allowing maximum fluid flow through the assembly. With the closure assembly 36 in an intermediate position, the flow of fluid is controlled between the maximum flow and zero.

As noted, the sleeve assembly 80 has the primary function of shutting off fluid flow, by sealing against the seating surface 94, when in the fully closed position. As the actuator assembly 30 moves the closure assembly 36 longitudinally from the fully closed position, the sleeve assembly 80 is lifted from the seating surface 94, as shown in FIG. 8. The sleeve assembly 80 is moved to expose the outer ends of the apertures 52 closest to the seating surface 94. However, the plug 60, extending longitudinally further than the sleeve assembly 80, still covers the inner ends of all the apertures 52 in the cage 50. As a result, fluid does not flow. Rather, further movement of the closure assembly 36 beyond the position shown in FIG. 8 is required, such that the inner ends of apertures 52 are exposed and the respective apertures fully opened to allow fluid to flow therethrough. It will thus be appreciated that, once the closure assembly 36 is moved from the fully closed position of FIG. 6, the control of fluid flow is achieved by the position of the plug 60 with respect to the cage 50. This arrangement prevents the fluid flow causing erosion of the seat 94 and the ridge 100, regardless of the position of the sleeve assembly 80.

Figure 9:
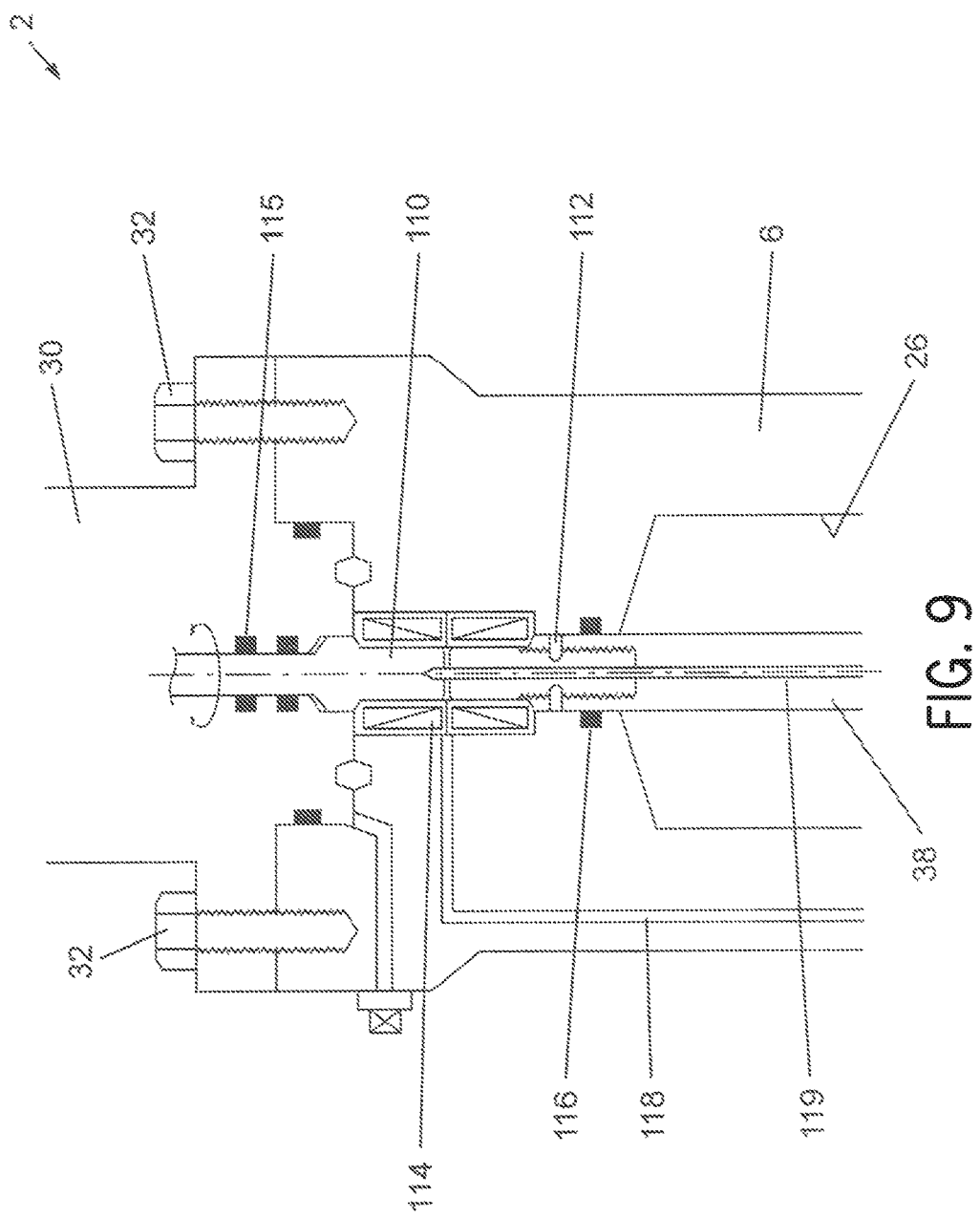
FIG. 9 is a detailed cross-sectional view of the assembly of FIG. 1, showing a first portion of the actuator mechanism.

Referring to FIG. 9, there is shown a detailed cross-sectional view of the actuator mechanism, in particular the connection between the actuator assembly 30 and the shaft 38. The actuator assembly 30 comprises an electric motor and gear drive assembly of conventional design (not shown for clarity). A torque shaft 110 extends from the actuator assembly 30 longitudinally through the end of the upper housing 6. The torque shaft 110 is connected to the upper end of the shaft 38, as viewed in FIG. 9 by a key and slot arrangement 112. In operation, the torque shaft 110 is rotated by the electric motor and gear assembly, the rotation of which is transferred directly to the shaft 38. A bi-directional thrust bearing assembly 114 is disposed in the end of the upper housing 6 and supports the torque shaft. A seal 116 of conventional design is provided in the end of the upper housing around the end portion of the shaft 38, to provide a seal against fluid leaking from the upper chamber 26 of the upper housing 6. In addition, in operation, hydraulic transmission fluid is supplied to the thrust bearing assembly 114 through a port 118 extending through the housing 6 and provides hydraulic compensation against the pressure of the fluid in the upper chamber 26 of the upper housing 6. The pressure of the hydraulic transmission fluid may be slightly higher than the fluid pressure within the upper housing 6. This arrangement means that the seal 116 is only required to provide a separation action between the pressure of the fluid within the valve assembly and the hydraulic transmission fluid, in turn increasing the working life and effectiveness of the seal 116.

The end portion of the shaft 38 distal from the actuator assembly 30 (that is the lower end as viewed in the figures) extends into the piston 68, as shown in FIG. 10. The piston 68 of the closure assembly 36 comprises a longitudinal bore 120, within which is mounted a generally tubular insert 122 having a central bore 124, by means of a threaded connection 126. The central bore 124 of the insert 122 aligns with the central bore 62 within the plug 60. The shaft 38 extends longitudinally within the insert 122, a portion 130 of the shaft extending within the insert being provided with a thread on its outer surface. The insert 122 retains within the bore 120 of the piston 68 a ball screw nut 132 to engage with the threaded portion 130 of the shaft 38. Rotation of the shaft 38, by means of the actuator assembly 30, is translated into longitudinal movement of the piston 68 by the engagement between the threaded portion 130 of the shaft and the ball screw nut 132.

The shaft 68 and insert 122 are provided with seals 134 and 136, respectively, to prevent fluid ingress from the open, upper end of the piston, as shown in FIG. 10. The free or distal end of the shaft 38 is provided with a sealing cap 138, connected to the endmost portion of the shaft 38 by a threaded connection. The sealing cap 138 is provided with fluid seals 140, to bear against the wall of the bore 62 in the plug 60. In operation, the sealing cap 138 is caused to rotate within the bore 62 in the plug 60, as the piston 68 is caused to move longitudinally by rotation of the shaft 38, as hereinbefore described.

As noted above, the cage 50 is provided with a plurality of apertures 52 therethrough, to allow fluid to flow from the flow chamber 12 to the outlet 16. The apertures 52 may be of conventional design, form and arrangement. However, the apertures are preferably formed to lie in discrete rows, separated by lands and to extend at an angle to the radial direction and at an angle in the longitudinal direction to the perpendicular to the longitudinal axis.

Conventional designs employ circular apertures extending perpendicular to the outer surface of the cage in the radial direction, that is extend radially inwards. The apertures are nested to have the apertures in one row extend into the interstices between the apertures of each adjacent row. In this way, the sleeve or plug moving along the outer or inner surface of the cage is varying the area of exposed apertures throughout its entire movement. This has the advantage of allowing a compact cage to be formed and use a plug or sleeve having a short stroke. However, this has been found to cause a very rapid and deleterious erosion of the end surfaces and portions of the plug or sleeve.

Figure 11:
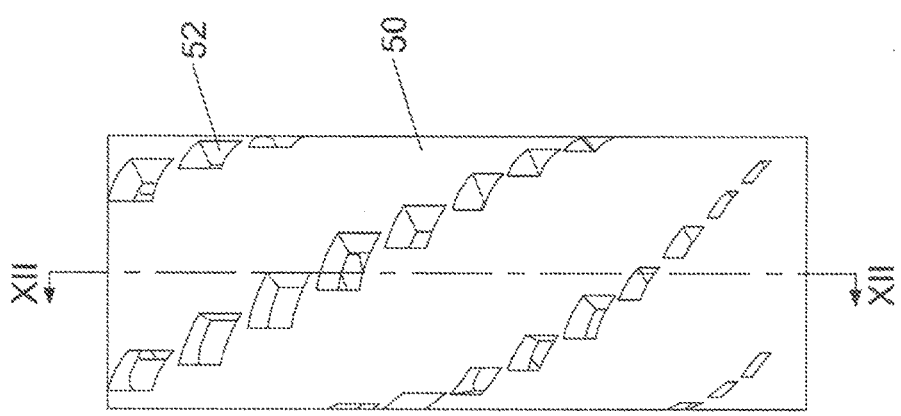
FIG. 11 is a perspective side view of the cage of the assembly of FIG. 1.

Referring to FIG. 11, there is shown a perspective side view of a cage 50 of preferred configuration. The cage 50 is shown in vertical cross-section in FIG. 12. A horizontal cross-sectional representation of the fluid flow through the cage 50 of FIG. 11 is shown in FIG. 13. As shown in FIG. 11, the cage 50 comprises a plurality of apertures 52 extending through the wall of the cage, each aperture having an opening in both the inner and outer surface of the cage wall. Each aperture extends at both an angle to the radial direction and at an angle in the longitudinal direction to the normal or perpendicular, as will now be described.

In general, the arrangement of the apertures is such that the curvature of the inner wall of the cage 50 is accommodated by the shape of the cross-section of the apertures, such that the opening of each aperture at the inner wall of the cage 50 is rectangular, giving rise to a rectangular jet of fluid entering the interior of the cage in use. As will be described, this is achieved by providing the apertures with a rhombic cross-section.

Referring to FIG. 11, the general direction of fluid flow through the bore of the cage 50 when in use is represented by arrow H. This general direction is longitudinally within the cage 50. Considering first the angle of the apertures in the plane perpendicular to the longitudinal axis, that is the horizontal as viewed in FIGS. 11 and 12, each aperture 52 extends through the wall of the cage 50 at an angle to the radial direction and opens tangentially to the inner wall of the cage 50. In operation, this causes the fluid to enter the cage 50 flowing in a direction parallel to the inner wall and to flow in a circular pattern, as represented in FIG. 13. This circular, downward twisting flow pattern prevents the incoming jets of fluid from opposing apertures from colliding within the cage. This in turn helps to maintain any separation of fluid phases that may be occurred or been induced upstream of the valve assembly and reduces the burden on fluid separation apparatus downstream of the assembly.

Further, considering the angle of the apertures in the longitudinal direction, each aperture extends at an angle to the perpendicular or radial direction longitudinally in the direction of flow indicated by the arrow H. The apertures may extend at any suitable angle to the perpendicular or (as viewed in FIGS. 11 and 12) horizontal plane and the angle will depend upon such factors as the dimensions of the cage and valve assembly, and the nature and composition of the fluid being processed. In the arrangement shown in the figures, the apertures extend at an angle of 25° to the perpendicular or horizontal. The angle of the apertures may range from 5° to 50°, more preferably from 10° to 40°. It is preferred that the apertures are angled in the longitudinal direction sufficient to ensure that the jet of fluid entering the cage through one aperture and flowing in a circular pattern adjacent the inner wall of the cage avoids contacting the jet of fluid entering the cage through the adjacent aperture in the direction of travel of the fluid.

In operation, the arrangement of the apertures 52 induces the fluid to flow in a helical pattern within the cage in the general direction of flow H with the fluid being subjected to minimal shear.

Figure 14:
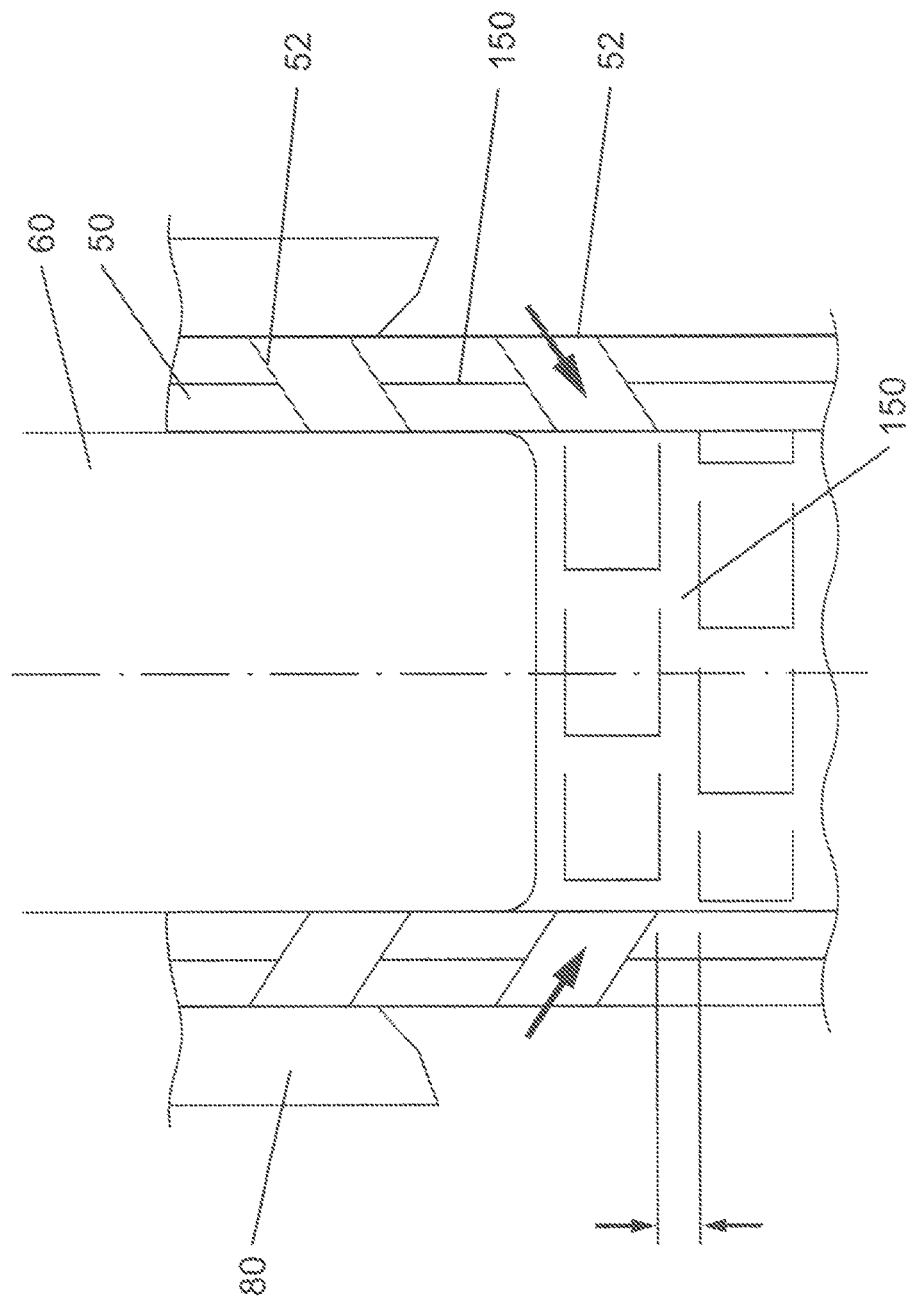
FIG. 14 is a cross-sectional representation showing the relationship of the plug within the cage and the apertures through the cage of the assembly of FIG. 1.

The apertures 52 are arranged in discrete rows extending circumferentially around the cage, each row containing one or more apertures, more preferably at least two apertures. The rows are separated by portions of the cage wall having no apertures, or 'lands' 150. This allows the plug 60 to be positioned such that its end surface does not extend across the inner opening of one or more apertures 52. This position is represented diagrammatically in FIG. 14. In this way, the fluid entering the cage 50 through the open apertures 52 adjacent the end of the plug 60 is not caused to flow or cut across the end surface of the plug 60, in turn reducing the erosion of the plug 60 by the fluid stream. The endmost portion of the plug 60 may be provided with a taper, as shown in FIG. 6, for example, in order to improve the flow pattern of the fluid in the region adjacent the end of the plug 60.

Figure 12:
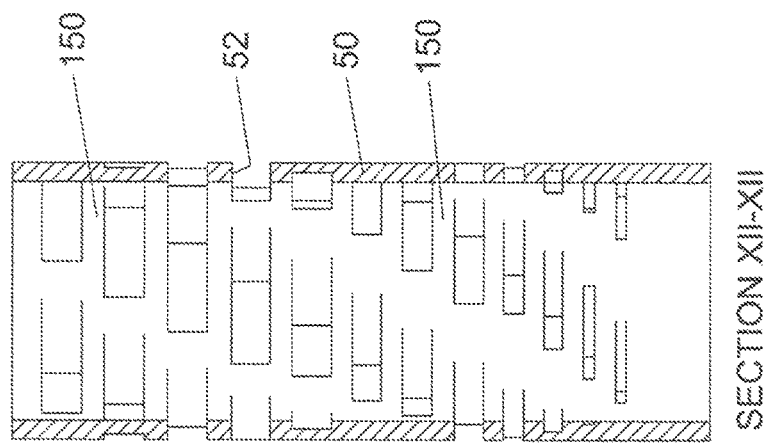
FIG. 12 is a vertical cross-sectional view of the cage of FIG. 11 along the line XII-XII.
Figure 13:
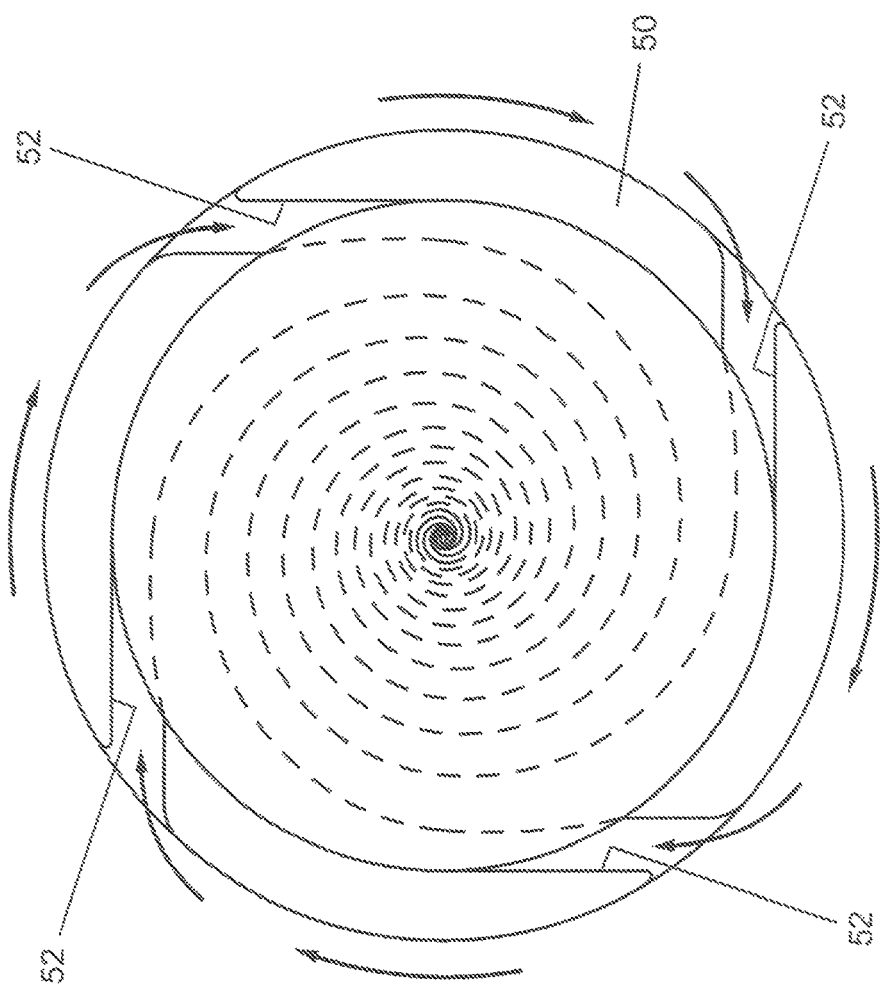
FIG. 13 is a horizontal cross-sectional representation of fluid flow through the cage of FIG. 11.

A preferred arrangement and sizing of the apertures 52 in the cage 50 is shown in FIGS. 11 and 12. In particular, it is to be noted that the apertures 52 are arranged in rows each having four apertures therein. The apertures 52 vary in cross-sectional area available for fluid flow as shown, such that the apertures in the rows closest to the fluid outlet (that is the lower portion of the cage 50 as shown in FIGS. 11 and 12) have the smallest cross-sectional area available for fluid flow, with the area for fluid flow increasing in the reverse direction of general fluid flow H or up the cage as shown in FIGS. 11 and 12. The rows of apertures are grouped according to aperture size, with each group comprising two, three or more rows of apertures of a given cross-sectional area. This provides for the relationship between the degree of travel of the closure member and the exposed area of the apertures (and hence the volume of fluid flow through the apertures) to be a smooth curve.

As shown in FIG. 11, the cross-section of each aperture is rhomboidal in shape, rather than rectangular, with the upper and lower edges of the rhomboid, as viewed in FIG. 11, being curved. This correction to the shape of the apertures has been found to be useful in minimizing the width of the lands required between adjacent rows of apertures, in turn reducing the overall length of the cage and closure assembly.

In the embodiment of the cage shown in FIGS. 11 and 12, the apertures in the cage extend in a helical pattern along the length of the cage. As described in the preceding general description, two alternative arrangements of the apertures in the cage may be provided, as shown in FIGS. 15 and 16.

Figure 15:
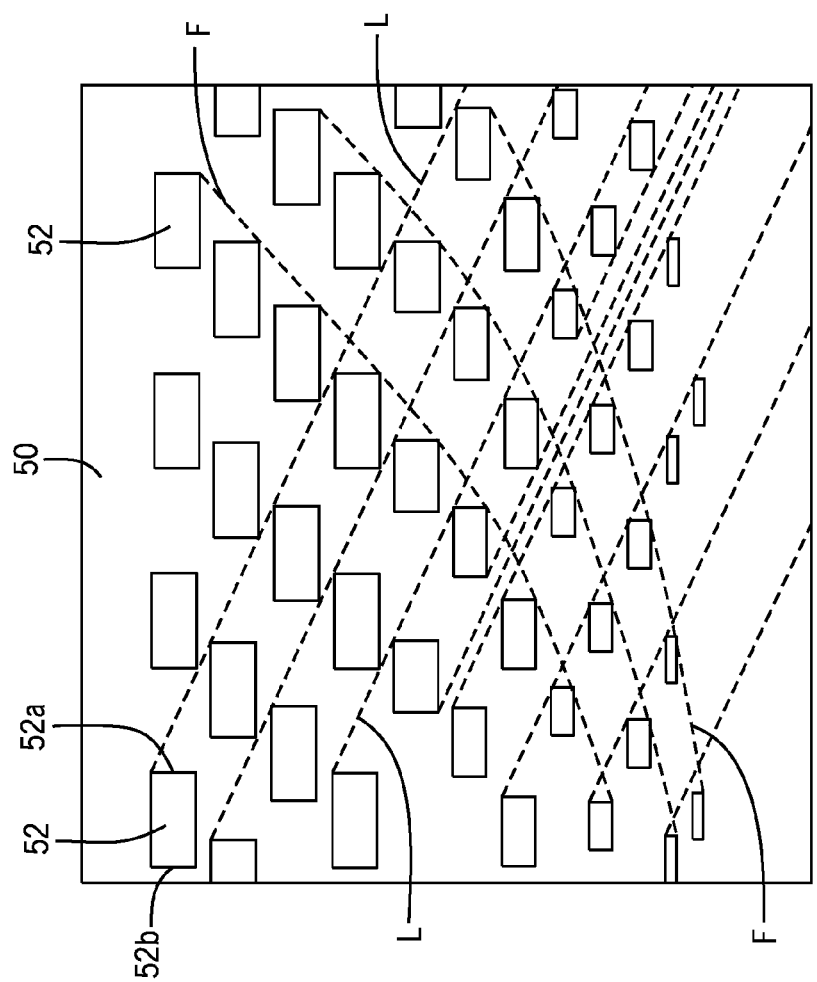
FIG. 15 is a representation of the inner surface of a cage of one embodiment of the present invention.
Figure 16:
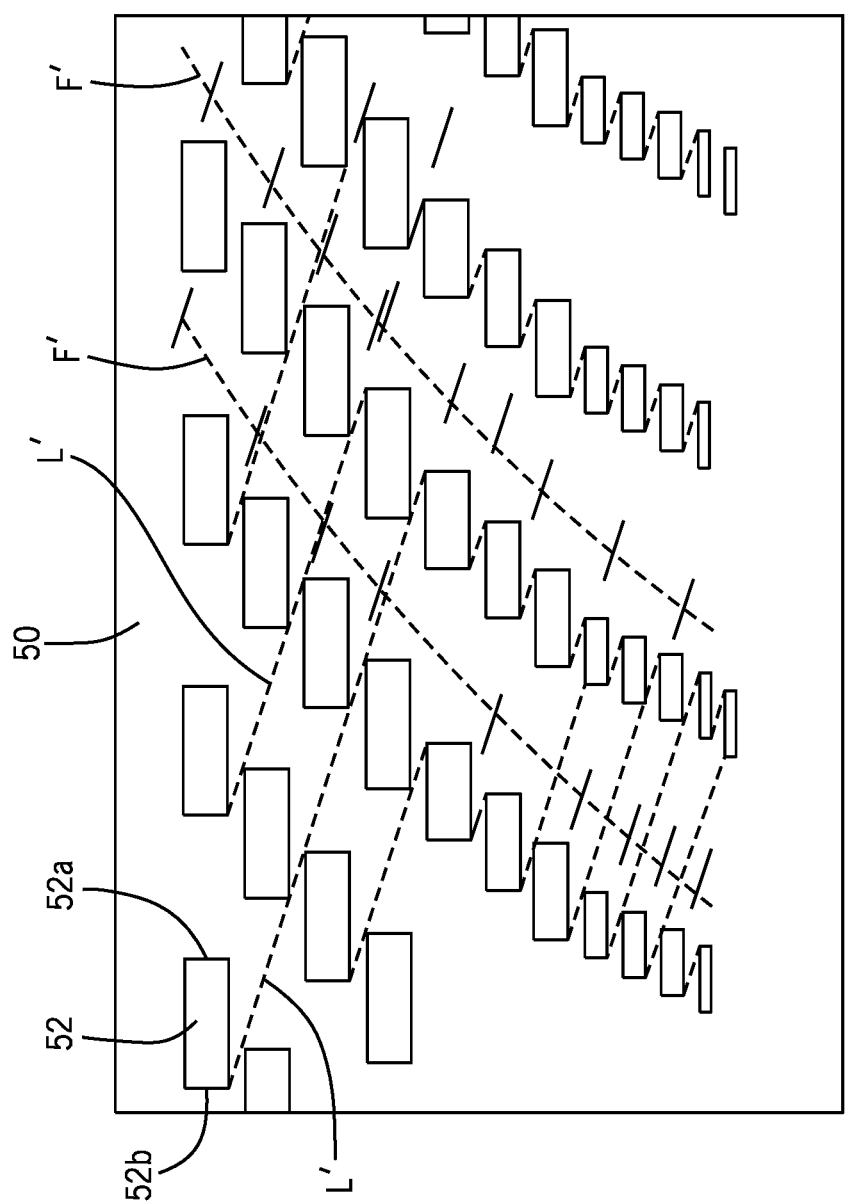
FIG. 16 is a representation of the inner surface of a cage of a second embodiment of the present invention.

Turning first to FIG. 15, there is shown a diagrammatical representation of the apertures 52 in a cage 50. For ease of reference, the inner surface of the cylindrical cage 50 has been represented as a flat surface in the figure. Each aperture 52 has a leading corner edge 52a and a lee corner edge 52b. In operation, each leading corner edge 52a is the upstream edge of the aperture 52, while each lee corner edge 52b is the downstream edge, when considered in relation to the direction of travel of fluid through the aperture and into the interior of the cage.

In the arrangement shown in FIG. 15, the apertures 52 are arranged in a regular, uniform, helical pattern along the length of the cage, extending from the upper right side of the cage surface to the lower left side of the cage surface. The apertures are arranged in the helical lines of apertures such that the leading corner edges 52a of in adjacent helical lines lie on a single line (indicated by the dotted lines L in FIG. 15). In particular, the generally upstream or upper end (as viewed in FIG. 15) of each leading corner edge 52a is arranged to lie on the line L. As the size of the apertures changes along the length of the cage, the flow from the upper apertures is not necessarily uniform over the lower apertures.

In operation, the arrangement shown in FIG. 15 maximizes the appeasement of the jets of incoming fluid between the rows of apertures having larger apertures, providing a uniform flow front of fluid. Some eddy currents may form adjacent the lower, smaller apertures. However, this is kept to a minimum by the arrangement of the apertures as shown in FIG. 15.

The flow front of fluid entering the cage through each helical line of apertures is indicated by the dotted lines F in FIG. 15. As can be seen, the flow front F for each helical line of apertures is substantially even for the larger apertures. However, the flow front can become uneven for the smaller apertures, as can be seen in the lower portion of the cage, as indicated in FIG. 15, where the fluid flows from the apertures in a number of discrete flow corridors.

An alternative arrangement is shown in FIG. 16. As for FIG. 15, there is shown a diagrammatical representation of the apertures 52 in a cage 50. For ease of reference, the inner surface of the cylindrical cage 50 has again been represented as a flat surface in the figure. Each aperture 52 has a leading corner edge 52*a* and a lee corner edge 52*b*.

In the arrangement shown in FIG. 16, the apertures 52 are arranged in a helical pattern along the length of the cage, extending from the upper right side of the cage surface to the lower left side of the cage surface. However, in the embodiment of FIG. 16, the apertures are arranged in the helical lines of apertures such that the lee corner edges 52*b* of the row above touch the lead corner edges 52*b* of the row below and lie on a single line (indicated by the dotted lines L' in FIG. 16). In particular, the generally downstream or lower end (as viewed in FIG. 16) of each lee edge 52*b* is arranged to lie on the line L'.

The flow front of fluid entering the cage through each helical line of apertures is indicated by the dotted lines F' in FIG. 16. As can be seen, the flow front F' for each helical line of apertures is substantially even along the entire length of the helical line of apertures. This arrangement is particularly advantageous when the valve assembly is first opened, that is the smaller apertures at the lower end of the cage (as viewed in FIG. 16) are opened. The highest pressure differential across the wall of the cage arises when the valve assembly is first opened, that is with only the smaller apertures in the lower portion of the cage open. The arrangement of FIG. 16 minimizes contact between the incoming jets of fluid as the apertures in the lower portion of the cage are opened. In particular, as indicated in FIG. 16, the fluid entering the interior of the cage through one aperture is caused to pass below (as viewed in FIG. 16) the adjacent upstream aperture, thus avoiding contact with the fluid entering the cage through the adjacent aperture. This in turn reduces the shear generated within the fluid streams within the cage.

As described hereinbefore, with reference to the arrangement of FIG. 1, the closure assembly 36 is provided with bores 66 and 74 extending through the plug 60 and piston 68 respectively. These bores are provided to allow the closure assembly 36 to be balanced with respect to the fluid pressure at the outlet. The principles of this pressure balancing will now be described having reference to FIG. 1.

Referring to FIG. 1, as described above, the plug 60 and sleeve assembly 80 both depend from the piston 68 of the closure assembly 36. The sleeve assembly 80 is moveable longitudinally within the first chamber 24 in the upper housing 6 of the assembly 2. However, the sleeve assembly is not sealed within the first chamber 24. Rather, fluid is allowed to flow from the flow chamber 12 into the first chamber 24 past the sleeve assembly 80, which fluid is at the fluid inlet pressure. A shoulder 200 is formed at the junction between the sleeve assembly 80 and the piston 68.

The shoulder 200 is exposed to fluid within the first chamber 24. Fluid pressure within the first chamber 24 thus bears on the surface of the shoulder 200 and acts to move the sleeve assembly 80 and the entire closure assembly 36 in the longitudinally downwards direction, as viewed in FIG. 1. Fluid at the inlet pressure within the flow chamber 12 also bears on the free or distal end surfaces of the sleeve assembly 80, urging the sleeve assembly 80 and the entire closure assembly 36 longitudinally upwards, as viewed in FIG. 1. The net force acting on the sleeve assembly 80 and urging the closure assembly 36 and its direction depends upon the ratio of the surface area of the shoulder 200 within the first chamber 24 and the surface area of the end surfaces of the sleeve assembly 80 within the flow chamber 12. The balancing of the closure assembly with respect to the inlet fluid pressure may thus be achieved by appropriate sizing of the shoulder 200 with respect to the end surface of the sleeve assembly 80. The arrangement allows for this sizing to be achieved by varying the diameter of the piston 68.

The sleeve assembly 80 has an inner diameter $D_s$ shown in FIG. 1. Similarly, the piston 68 has an outer diameter $D_p$ shown in FIG. 1. In the arrangement that $D_p$ is less than $D_s$, the surface area of the shoulder 200 within the first chamber 24 is greater than the surface area of the end surface of the sleeve assembly 80. In such a case, the closure assembly 36 is biased into the fully closed position by the inlet fluid pressure. Similarly, with $D_p$ greater than $D_s$, the surface area of the shoulder 200 is less than the area of the free end surface of the sleeve assembly 80, thus having the closure assembly biased into the fully open position by the inlet fluid pressure. With $D_p$ equal to $D_s$, the closure assembly is neutrally biased or balanced with respect to the inlet fluid pressure.

As described above, ports 66 and 74 ensure that the second chamber 26 in the upper housing 6 is in fluid communication with fluid within the cage 50, that is fluid at the outlet pressure. Fluid pressure in the second chamber 26 bears on the upper or exposed end of the piston 68, giving an effective area of $D_p$ less the area of the shaft 38, urging the piston and closure assembly longitudinally downwards, as viewed in FIG. 1, into the fully closed position. Fluid within the cage 50 bears upon the exposed or distal end surface of the plug 60 and inner area giving a total effective area of $D_s$ less the area of the end of the shaft 38, urging the plug and closure assembly 36 longitudinally upwards, as viewed in FIG. 1. The net force acting on the closure assembly 36 by the fluid at outlet pressure and its direction is determined by the ratio of the surface areas of the free end of the piston 38 and the distal end of the plug 60. In the arrangement shown, the net effect of the fluid at the outlet pressure acting within the cage 50 and within the second chamber 26 is to neutrally bias or balance the closure assembly with respect to the outlet pressure.

The assembly of FIG. 1 may be arranged to have the closure assembly 36 during operation balanced by the fluid pressures such that there are no net forces acting to urge the closure assembly 36 into either the fully open or fully closed position. In this arrangement, the actuator assembly 30 is required to perform the least work to move the closure assembly and operate the valve assembly. Alternatively, the closure assembly may be sized to have the net fluid pressure bias the closure assembly into the fully open or fully closed position. Thus, the assembly may be provided in arrangements termed as open- or closed-friendly, as required, that is with the biasing assisting the actuator in opening or closing the valve. While this may be preferred and required for certain operations, the biasing applied to the closure assembly by the fluid pressures will need to be overcome by the actuator assembly, during operation. This will likely increase the load on the actuator assembly and, in the case of high pressure fluids, require a more powerful actuator assembly to be employed.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A valve assembly comprising:
a valve housing;
an inlet for fluid entering the valve housing;
an outlet for fluid leaving the valve housing;
a flow control assembly disposed within the valve housing between the inlet and the outlet, whereby fluid entering the valve housing is caused to flow through the flow control assembly, the flow control assembly comprising:
a cage having apertures therethrough to provide passage for fluid passing from the inlet to the outlet, the cage having an outlet end, in use fluid flowing within the cage in a downstream direction towards the outlet; and
a closure assembly moveable with respect to the cage to open or close each of the apertures through the cage, to thereby control the flow of fluid through the cage;
wherein the apertures in the cage extend through the cage at a first angle to a radial direction of the cage and at a second angle to a longitudinal axis of the cage, such that, in use, fluid entering the cage through each aperture is directed into the cage at the first angle to the radial direction so as to flow around an interior of the cage and at the second angle to the longitudinal axis of the cage so as to flow in the downstream direction towards the outlet end of the cage, wherein the apertures are placed in a plurality of rows, wherein the apertures progressively increase in size from one row to another of the plurality of rows along the longitudinal axis of the cage in an opening direction of the closure assembly, wherein each aperture has a corner edge aligned on a helix with the corner edge being the same for each aperture on the helix, wherein the corner edge is a lee corner edge or a leading corner edge, wherein the apertures progressively increase in size in a direction along the helix, and wherein the lee corner edge or the leading corner edge of the apertures in respective neighboring rows do not overlap the apertures on the helix with respect to the longitudinal axis of the cage.

2. The valve assembly according to claim 1, wherein all the fluid entering the valve housing through the inlet is caused to flow through the flow control assembly to the outlet.

3. The valve assembly according to claim 1, wherein the valve housing comprises a cavity therein, the flow control assembly being disposed within the cavity.

4. The valve assembly according to claim 3, wherein the inlet is tangential to a wall of the cavity.

5. The valve assembly according to claim 3, wherein the inlet directs fluid into an involute channel or groove that extends around a wall of the cavity.

6. The valve assembly according to claim 1, wherein the apertures are arranged in the cage in a plurality of rows, each row containing one or more apertures, with adjacent rows being separated by a land or region having no apertures therethrough.

7. The valve assembly according to claim 1, wherein the first angle, the second angle, or both, is at least 10° to the radial direction.

8. The valve assembly according to claim 1, wherein the first angle, the second angle, or both is at least 45° to the radial direction.

9. The valve assembly according to claim 1, wherein each aperture is tangential to an inner surface of a wall of the cage.

10. The valve assembly according to claim 1, wherein all the apertures in the cage extend at a second angle.

11. The valve assembly according to claim 1, wherein the second angle of the apertures is such that fluid entering the interior of the cage through a first aperture is guided around the interior of the cage at the first angle of the first aperture to pass below a stream of fluid entering the cage through a second aperture adjacent the first aperture and in a same lateral plane as the first aperture.

12. The valve assembly according to claim 1, wherein the first angle and the second angle are at least 10°.

13. The valve assembly according to claim 1, wherein the apertures are quadrilateral in shape.

14. The valve assembly according to claim 13, wherein the apertures are parallelograms.

15. The valve assembly according to claim 14, wherein the apertures are rhomboidal.

16. The valve assembly according to claim 1, wherein upstream and/or downstream edges of each aperture are curved.

17. The valve assembly according to claim 1, wherein the cage comprises apertures of a plurality of different sizes.

18. The valve assembly according to claim 17, wherein the apertures first opened when the closure assembly is moved from a fully closed position are smaller in size than the apertures opened subsequently, as the closure assembly moves further to a fully open position.

19. The valve assembly according to claim 1, wherein the apertures are arranged in rows, the apertures in adjacent rows being staggered or offset in a circumferential direction from one another, such that apertures in adjacent rows do not lie on a same longitudinally extending line of a wall of the cage.

20. The valve assembly according to claim 1, wherein a plurality of apertures extend in a single helix or a plurality of helices from an upstream end of the cage to a downstream end of the cage.

21. The valve assembly according to claim 20, wherein each aperture has a leading edge and a plurality of apertures are arranged on the helix having their leading edges lying on a single helix line extending on an interior surface of a wall of the cage.

22. The valve assembly according to claim 20, wherein each aperture has a lee edge and a plurality of apertures are arranged on the helix having their lee edges lying on a single helix line extending on an interior surface of a wall of the cage.

23. The valve assembly according to claim 20, wherein a plurality of apertures are arranged in a helical pattern, with a first group of larger apertures having their leading edges lying on a first helix and a second group of smaller apertures having their lee edges lying on a second helix.

24. The valve assembly according to claim 1, wherein the closure assembly comprises a plug moveable within the cage, wherein the plug has a conical end surface, wherein the conical end surface defines a third angle to the longitudinal axis of the cage and wherein the third angle is the same as the second angle.

25. An apparatus, comprising:
a cage assembly for use in a fluid valve assembly, the cage assembly comprising:
a cage having apertures therethrough to provide passage for fluid passing from an exterior surface of a cage wall to an interior surface of the cage wall, the cage having a longitudinal axis;
wherein the apertures in the cage extend through the cage wall at a first angle to a radial direction and at a second angle to the longitudinal axis of the cage, such that, in use, fluid entering the cage through each aperture is directed into the cage at an angle to the radial direction and at an angle to the longitudinal axis in a downstream direction, wherein each aperture has a leading corner edge aligned on a helix extending on an interior surface of the cage wall, wherein the apertures progressively increase in size in a direction along the helix, and wherein the leading corner edge of the apertures in respective neighboring rows do not overlap the apertures on the helix with respect to the longitudinal axis of the cage.

26. The apparatus of claim 25, wherein the apertures have a rhomboidal shape.

27. An apparatus, comprising:
a cage assembly for use in a fluid valve assembly, the cage assembly comprising:
a cage having apertures therethrough to provide passage for fluid passing from an exterior of the cage to an interior of the cage through a cage wall, the cage having a longitudinal axis;
wherein each aperture has a lee corner edge aligned on a helix extending on an interior surface of the cage wall, wherein the apertures progressively increase in size in a direction along the helix, and wherein the lee corner edge of the apertures in respective neighboring rows do not overlap the apertures on the helix with respect to the longitudinal axis of the cage.

28. The apparatus of claim 27, wherein the apertures have a rhomboidal shape.

* * * * *